US009813734B2

(12) United States Patent
Sasai et al.

(10) Patent No.: US 9,813,734 B2
(45) Date of Patent: *Nov. 7, 2017

(54) SYSTEM AND METHOD FOR PERFORMING IMAGE DATA CONVERSION USING INTRAPREDICTION MODES

(71) Applicant: Sun Patent Trust, New York, NY (US)

(72) Inventors: Hisao Sasai, Osaka (JP); Takahiro Nishi, Nara (JP); Youji Shibahara, Tokyo (JP); Toshiyasu Sugio, Osaka (JP); Kyoko Tanikawa, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,665

(22) Filed: Feb. 9, 2017

(65) Prior Publication Data

US 2017/0155923 A1    Jun. 1, 2017

Related U.S. Application Data

(63) Continuation of application No. 14/842,201, filed on Sep. 1, 2015, now Pat. No. 9,602,836, which is a
(Continued)

(51) Int. Cl.
*G06K 9/46* (2006.01)
*H04N 19/593* (2014.01)
(Continued)

(52) U.S. Cl.
CPC ........... *H04N 19/593* (2014.11); *H04N 19/91* (2014.11); *H04N 19/184* (2014.11); *H04N 19/186* (2014.11)

(58) Field of Classification Search
CPC ........... G06T 9/00; G06T 9/004; G06T 9/005; H04N 7/30; H04N 7/34; H04N 7/50; H04N 7/26244; H04N 7/26015; H04N 7/26127
(Continued)

(56) References Cited

U.S. PATENT DOCUMENTS 4,758,881 A    7/1988  Laspada
8,811,761 B2   8/2014  Sasai
(Continued)

FOREIGN PATENT DOCUMENTS

WO    2010/028967    3/2010

OTHER PUBLICATIONS

Office Action issued in E.P. Patent Appl. No. 1281530.9, dated Mar. 22, 2017.
(Continued)

*Primary Examiner* — Andrew Moyer
(74) *Attorney, Agent, or Firm* — Greenblum & Bernstein, P.L.C.

(57) ABSTRACT

A device and method for decoding, from a bitstream including encoded data, intra prediction modes indicated for decoding an image. Context adaptive binary arithmetic decoding is performed using a variable probability to generate decoded luma context-dependent segments. Context adaptive binary arithmetic decoding is performed using a variable probability to generate a decoded chroma context-dependent segment. Bypass decoding using a fixed probability is performed to generate decoded luma context-independent segments. Luma intra prediction modes are derived from one of the decoded luma context-dependent segments and a corresponding one of the decoded luma
(Continued)

context-independent segments. A chroma intra prediction mode is derived from the decoded chroma context-dependent segment.

2 Claims, 35 Drawing Sheets

Related U.S. Application Data continuation of application No. 14/448,202, filed on Jul. 31, 2014, now Pat. No. 9,159,142, which is a continuation of application No. 14/022,642, filed on Sep. 10, 2013, now Pat. No. 8,837,846, which is a continuation of application No. 13/816,838, filed as application No. PCT/JP2012/004197 on Jun. 28, 2012, now Pat. No. 8,811,761.

(60) Provisional application No. 61/508,762, filed on Jul. 18, 2011.

(51) Int. Cl.
*H04N 19/91* (2014.01)
*H04N 19/184* (2014.01)
*H04N 19/186* (2014.01)

(58) Field of Classification Search
USPC .................................................. 382/238, 239
See application file for complete search history.

(56) References Cited

U.S. PATENT DOCUMENTS

| | | | |
|---|---|---|---|
| 8,837,846 B2 | 9/2014 | Sasai | |
| 9,159,142 B2 * | 10/2015 | Sasai | G06T 9/004 |
| 9,602,836 B2 * | 3/2017 | Sasai | H04N 19/593 |
| 2005/0089234 A1 | 4/2005 | Base et al. | |
| 2006/0268990 A1 | 11/2006 | Lin et al. | |
| 2009/0080521 A1 * | 3/2009 | Marpe | H04N 19/176 375/240.12 |
| 2010/0310185 A1 | 12/2010 | Liu | |
| 2011/0211584 A1 | 9/2011 | Mahmoud | |
| 2012/0014454 A1 * | 1/2012 | Budagavi | H04N 19/91 375/240.16 |
| 2012/0300846 A1 | 11/2012 | Sugio et al. | |
| 2012/0307902 A1 | 12/2012 | Sugio et al. | |
| 2013/0010869 A1 | 1/2013 | Sugio et al. | |
| 2013/0039593 A1 | 2/2013 | Komiya et al. | |

OTHER PUBLICATIONS

Chuohao Yeo et al., Non-CE6: On intra prediction mode coding, Joint Collaborative Team on Video Coding (JCT-VC) of ITU-T SG16 WP3 and ISO/IEC JTC1/SC29/WG11, 7$^{th}$ Meeting: Geneva, CH, Nov. 2011, JCTVC-G153, pp. 1-12.

Vadim Seregin and Il-Koo Kim, Utilisation of CABAC equal probability mode for intra modes coding, Joint Collaborative Team on Video Coding (JCT-VC) of ITU-T SG16 WP3 and ISO/IEC JTC1/SC29/WG11, 6$^{th}$ Meeting: Torino, IT, Jul. 14, 2011, JCTVC-F376, pp. 1-3.

Hisao Sasai and Takahiro Nishi, Fixed Probability coding for Intra Mode Coding, Joint Collaborative Team on Video Coding (JCT-VC) of ITU-T SG16 WP3 and ISO/IEC JTC1/SC29/WG11, 6$^{th}$ Meeting: Torino, IT, Jul. 14, 2011, JCTVC-F426, pp. 1-4.

Hisao Sasai and Takahiro Nishi, Modified MVD coding for CABAC, Joint Collaborative Team on Video Coding (JCT-VC) of ITU-T SG16 WP3 and ISO/IEC JTC1/SC29/WG11, 6$^{th}$ Meeting: Torino, IT, Jul. 14, 2011, JCTVC-F423rl, pp. 1-6.

Mei Guo et al., Improved Intra Mode Coding, Joint Collaborative Team on Video Coding (JCT-VC) of ITU-T SG16 WP3 and ISO/IEC JTC1/SC29/WG11, 4$^{th}$ Meeting: Daegu, Korea, Jan. 2011, JCTVC-D166, pp. 1-7.

"Advanced video coding for generic audiovisual services", ITU-T Recommendation H.264, Mar. 2010.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, Ver. 8, 5th Meeting: Geneva, CH, Mar. 16-23, 2011.

Vivienne Sze et al., "Parallel Context Processing of Coefficient Level", Joint Collaborative Team on Video Coding (JCT-VC) of ITU-T SG16 WP3 and ISO/IEC JTC1/F130, 6th Meeting: Torino, IT, Jul. 14-22, 2011.

U.S. Appl. No. 13/669,690 to Hisao Sasai et al., filed Nov. 6, 2012.
U.S. Appl. No. 61/556,406 to Hisao Sasai et al., filed Nov. 7, 2011.
U.S. Appl. No. 61/508,762 to Hisao Sasai et al., filed Jul. 18, 2011.
U.S. Office Action (U.S. Appl. No. 13/816,838) dated Nov. 22, 2013.

Rosewarne et al.: "Non-CE6: Intra-mode bypass parallelism (IMBP)", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: WFTP3.ITU.INT/AV-ARCH/JCTVC-SITE/, No. JCTVC-H-0244, Jan. 20, 2012, XP030111271.

McCann et al.: "HEVC Test Model 3 (HM 3) Encoder Description", Jun. 2, 2011, No. JCTVC-E602, Jun. 2, 2011, XP030009013, ISSN: 0000-0003.

Search report from E.P.O., dated Nov. 17, 2014.

Rosewarne et al.: "Non-CE6: Intra-mode bypass parallelism (IMBP)", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL: WFTP3.ITU.INT-AV-ARCH/JCTVC-SITE/, No. JCTVC-H-0244, Jan. 20, 2012, XP030111271.

Chien et al.: "Intra mode coding for INTRA N×N", 100, MPEG Meeting; Apr. 30, 2012-May 4, 2012; Geneva; (Motion Picture Expert Group or ISO/IEC JTC1/SC29/WG11), No. m24549, Apr. 17, 2012, XP030052892.

Sasai et al.: "Fixed probability coding for intra mode", 97. MPEG Meeting; Jul. 18, 2011-Jul. 22, 2011; Torino; (Motion Picture Expert Group or ISO/IEC JTC1/SC29/WG11), No. m20854, Jul. 11, 2011, XP030049417.

Wiegand et al.: "WD3: Working Draft 3 of High-Efficiency Video Coding", Mar. 30, 2011, No. JCTVC-E603, Mar. 30, 2011, XP030009014, ISSN: 0000-0003.

McCann et al.: "HEVC Test Model 3 (HM 3) Encoder Description", Jun. 2, 2011, No. JCTVC-E602, Jun. 2, 2011, XP030009013, ISSS: 0000-0003.

Sasai et al.: "Modified MVD coding for CABAC", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16); URL: WFTP3.ITU.INT/AV-ARCH/JCTVC-SITE/, No. JCTVC-F423, Jul. 1, 2011, XP030009446.

Chuohao Yeo et al.: Non-CE6: On intra prediction mode coding, Joint Collaborative Team on Video Coding (JCT-VC) of ITU-T SG16 WP3 and ISO/IEC JTC1/SC29/WG11, 7$^{th}$ Meeting: Geneva, CH, Nov. 2011, JCTVC-G153, pp. 1-12.

Chuohao Yeo et al., Non-CE6: On intra prediction mode coding, Joint Collaborative Team on Video Coding (JCT-VC) of ITU-T SG16 WP3 and ISO/IEC JTC1/SC29/WG11, 7th Meeting: Geneva, CH, Nov. 2011, JCTVC-G153, pp. 1-12.

Office Action issued in E.P. Patent Appl. No. 12815350.9, dated Mar. 22, 2017.

Office Action issued in Japan Patent Appl. No. JP 2016-161405 dated Jul. 4, 2017.

* cited by examiner

FIG. 14

| prediction_unit( x0, y0, log2PUWidth, log2PUHeight, PartIdx, InferredMergeFlag){ | Descriptor |
|---|---|
| if( skip_flag[x0][y0]){ | |
| if(NumMergeCand>1) | |
| merge_idx[x0][y0]) | ue(v) | ae(v) |
| } else if(PredMode == MODE_INTRA){ | |
| prev_intra_luma_pred_flag[x0][y0] | u(l) | ae(v) |
| if( prev_intra_luma_pred_flag[x0][y0]) | |
| if(NumMPMCand>1) | |
| mpm_idx[x0][y0] | u(l) | ae(v) |
| else | |
| Intra_combo_pred_mode[x0][y0] | ue(v) | ae(v) |
| | ue(v) | ae(v) |
| } else {/*MODE_INTER*/ | |

FIG. 21

| | |
|---|---|
| prev_intra_luma_pred_flag | Context adaptive binary arithmetic coding |
| if( prev_intra_luma_pred_flag ) | |
|    mpm_idx | Bypass coding |
| else | |
|    rem_intra_luma_pred_mode | Bypass coding |
| intra_chroma_pred_mode | Context adaptive binary arithmetic coding + Bypass coding | prev_intra_luma_pred_flag ( Context adaptive binary arithmetic coding )

⇓          ⇓

| mpm_idx | rem_intra_luma_pred_mode |
|---------|--------------------------|
| 0 | 0 |
| 1 | 1 |
| 2 | 2 |
| ( Bypass coding ) | 3 |
|  | 4 |
|  | ⋮ |
|  | ( Bypass coding ) |

| intra_chroma_pred_mode | |
|---|---|
| 0 | 0 |
| 1 | 1 0 0 |
| 2 | 1 0 1 |
| 3 | 1 1 0 |
| 4 | 1 1 1 |

Context adaptive     ⇓ ⇓
binary arithmetic coding    Bypass coding

FIG. 25

| | |
|---|---|
| prev_intra_luma_pred_flag | Context adaptive binary arithmetic coding |
| if( prev_intra_luma_pred_flag ) | |
| mpm_idx | Bypass coding |
| else | |
| rem_intra_luma_pred_mode | Bypass coding |
| prev_intra_luma_pred_flag | Context adaptive binary arithmetic coding |
| if( prev_intra_luma_pred_flag ) | |
| mpm_idx | Bypass coding |
| else | |
| rem_intra_luma_pred_mode | Bypass coding |
| prev_intra_luma_pred_flag | Context adaptive binary arithmetic coding |
| if( prev_intra_luma_pred_flag ) | |
| mpm_idx | Bypass coding |
| else | |
| rem_intra_luma_pred_mode | Bypass coding |
| prev_intra_luma_pred_flag | Context adaptive binary arithmetic coding |
| if( prev_intra_luma_pred_flag ) | |
| mpm_idx | Bypass coding |
| else | |
| rem_intra_luma_pred_mode | Bypass coding |
| intra_chroma_pred_mode | Context adaptive binary arithmetic coding + Bypass coding |

FIG. 34

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) | ex800

FIG. 45
| Corresponding standard | Driving frequency |
|---|---|
| MPEG-4 AVC | 500 MHz |
| MPEG-2 | 350 MHz |
| ⋮ | ⋮ |
FIG. 46A
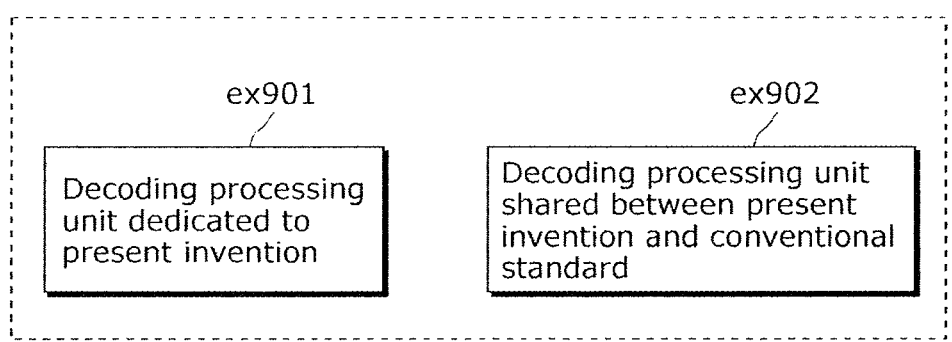
FIG. 46B
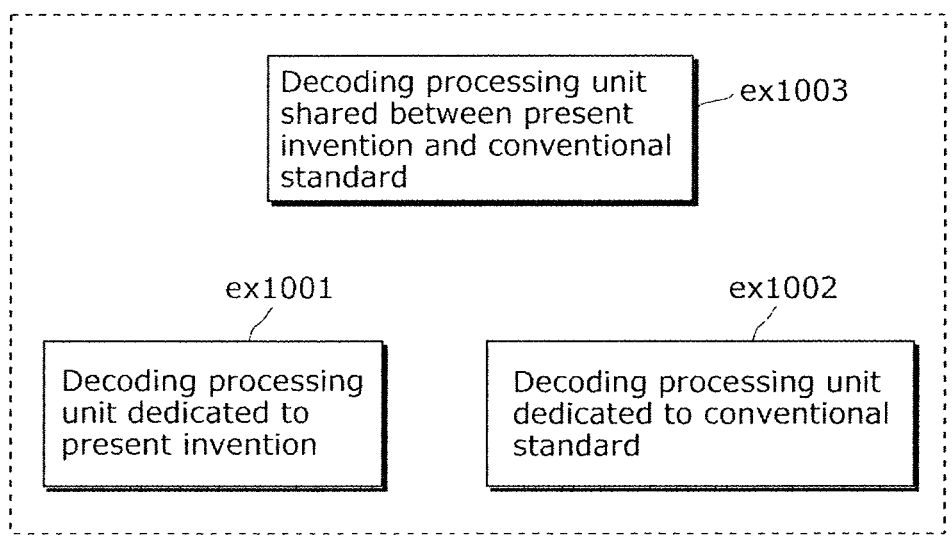

SYSTEM AND METHOD FOR PERFORMING IMAGE DATA CONVERSION USING INTRAPREDICTION MODES

CROSS REFERENCE TO RELATED APPLICATIONS

This application is a continuation of U.S. application Ser. No. 14/842,201, filed Sep. 1, 2015, which is a continuation of U.S. application Ser. No. 14/448,202, filed Jul. 31, 2014 (now U.S. Pat. No. 9,159,142, issued Oct. 13, 2015), which is a continuation of U.S. application Ser. No. 14/022,642, filed Sep. 10, 2013 (now U.S. Pat. No. 8,837,846, issued Sep. 16, 2014), which is a continuation of U.S. application Ser. No. 13/816,838, filed Feb. 13, 2013 (now U.S. Pat. No. 8,811,761, issued Aug. 19, 2014), which is a National Phase application of International Application No. PCT/JP2012/004197, filed Jun. 28, 2012, and claims the benefit of U.S. Provisional Application No. 61/508,762, filed Jul. 18, 2011, the disclosures of which are incorporated by reference herein in their entireties.

TECHNICAL FIELD

The present invention relates to an image coding method for coding an image using plural intra prediction modes.

BACKGROUND ART

Examples of a technique with regard to an image coding method for coding an image using plural intra prediction modes include techniques disclosed in Non Patent Literatures (NPLs) 1 and 2.

CITATION LIST

Non Patent Literature

[NPL 1] ITU-T Recommendation H.264 "Advanced video coding for generic audiovisual services", March, 2010
[NPL 2] JCT-VC "WD3: Working Draft 3 of High-Efficiency Video Coding", JCTVC-E603, March 2011

SUMMARY OF INVENTION

Technical Problem

Inefficiently coding an image causes a delay of processing, and also exerts an influence on decoding the image.

In view of this, an object of the present invention is to provide an image coding method for efficiently coding information of an image.

Solution to Problem

In order to achieve the above object, an image coding method according to an aspect of the present invention is an image coding method for coding an image using plural intra prediction modes, the image coding method including coding first binary data and second binary data, the first binary data indicating a first intra prediction mode used to code the image, the second binary data indicating a second intra prediction mode used to code the image, wherein in the coding, a first context adaptive portion and a second context adaptive portion are coded by context adaptive binary arithmetic coding, the first context adaptive portion being part of the first binary data, the second context adaptive portion being part of the second binary data, the context adaptive binary arithmetic coding being arithmetic coding using a variable probability updated based on coded data, a first bypass portion and a second bypass portion are coded by bypass coding, the first bypass portion being different part of the first binary data, the second bypass portion being different part of the second binary data, the bypass coding being arithmetic coding using a predetermined fixed probability, and coded data is generated which includes the first context adaptive portion, the second context adaptive portion, the first bypass portion, and the second bypass portion, the first bypass portion and the second bypass portion being included subsequent to the first context adaptive portion and the second context adaptive portion.

It should be noted that these general and specific aspects may be implemented using an apparatus, a system, an integrated circuit, a computer program, a computer-readable non-transitory recording medium such as a CD-ROM, or an arbitrary combination of apparatuses, systems, methods, integrated circuits, computer programs or recording media.

Advantageous Effects of Invention

The present invention allows information of an image to be efficiently coded.

BRIEF DESCRIPTION OF DRAWINGS

FIG. 14 illustrates syntax showing an example of a data structure according to the variation of Embodiment 1.

FIG. 21 illustrates an example of syntax according to Embodiment 3.

FIG. 25 illustrates a first variation of syntax according to Embodiment 3.

FIG. 34 illustrates a structure of multiplexed data.

FIG. 45 illustrates an example of a look-up table in which video data standards are associated with driving frequencies.

FIG. 46A is a diagram showing an example of a configuration for sharing a module of a signal processing unit.

FIG. 46B is a diagram showing another example of a configuration for sharing a module of the signal processing unit.

Figure 1:
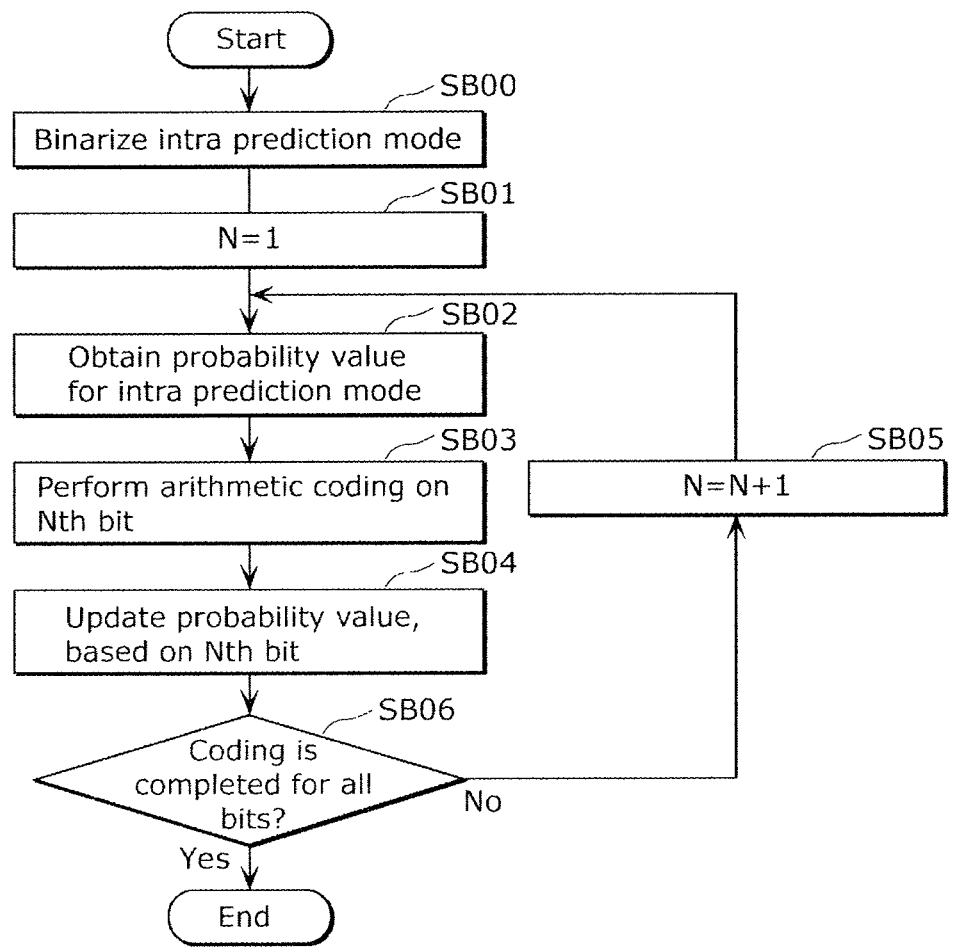
FIG. 1 is a flowchart illustrating coding processing on an intra prediction mode.

DESCRIPTION OF EMBODIMENTS (Underlying Knowledge Forming Basis of the Present Invention)

Examples of a video coding standard for compressing video data include the International Telecommunication Union Telecommunication Standardization sector (ITU-T) standard typified by H.26x, and the ISO/IEC standard typified by MPEG-x. The latest and most advanced video coding standard is a standard typified by H.264/MPEG-4 AVC (NPL 1). Now, the high efficiency video coding (HEVC) standard which is a next-generation image coding standard has been examined as a next standard (NPL 2).

As a technique used in these standards, inter prediction coding for compressing video data with reference to inter picture pixel information and intra prediction coding for compressing video data with reference to intra picture pixel information are used.

In intra prediction coding, directions for generating predicted pixel values from peripheral pixel values and the like are distinguished in accordance with an intra prediction mode (IntraPredMode). If intra prediction coding is used, an intra prediction mode is selected from among plural intra prediction modes.

The number of such plural intra prediction modes (intraPredModeNum) is determined according to the size of a block to be coded. For example, the number of intra prediction modes is determined according to the value of log 2TrafoSize indicating the size of a block and the type of prediction unit (PU). More specifically, for a block whose log 2TrafoSize has a value of 3 or more and 5 or less, it is considered to set the value of intraPredModeNum to 34, and prepare 34 intra prediction modes.

The value (or label) of an intra prediction mode indicates the direction of prediction. For example, 0 indicates the vertical direction, 1 indicates the horizontal direction, 2 indicates the non-direction called DC mode prediction, and 3 or more (3 or more and 33 or less for a block having a predetermined size) each indicate the direction associated therewith.

An intra prediction mode corresponding to luma and an intra prediction mode corresponding to chroma may differ from each other. In the following, an intra prediction mode corresponding to luma is referred to as a luma prediction mode, and an intra prediction mode corresponding to chroma is referred to as a chroma prediction mode.

Mode information for identifying which mode among plural intra prediction modes is used for a block to be intra-predicted is coded as information of a prediction unit. Currently, it is considered to include the following three elements in mode information of a luma prediction mode.

The first element is prev_intra_luma_pred_flag (previous intra luma prediction flag). "prev_intra_luma_pred_flag" is a flag for determining whether to use the value of an intra prediction mode of an adjacent prediction unit which has been previously coded (decoded).

The second element is mpm_idx (most probable mode index). "mpm_idx" is an index indicating which most probable mode is to be selected if there are two or more candidates for an intra prediction mode (most probable modes). For example, the default value of mpm_idx is 0, which indicates that the first most probable mode is to be selected.

The third element is rem_intra_juma_pred_mode (remaining intra luma prediction mode). "rem_intra_luma_pred_mode" is a sign (value) associated with a luma prediction mode.

Also, it is considered to include intra_chroma_pred_mode (intra chroma prediction mode) in mode information of an intra prediction mode corresponding to chroma. "intra_chroma_pred_mode" is a sign (value) corresponding to a chroma prediction mode.

In the process of decoding, such mode information is extracted from a code string by a predetermined variable-length decoding method such as an arithmetic decoding method. Then, an intra prediction mode is derived using the mode information. Alternatively, information for deriving an intra prediction mode is derived. For example, a luma prediction mode is expressed by a number 0 or more and 33 or less, and is one of 34 modes. Furthermore, for example, a chroma prediction mode is expressed by a number 0 or more and 4 or less, and is one of five modes.

FIG. 1 is a flowchart illustrating coding processing on an intra prediction mode. When arithmetic coding is performed, a luma prediction mode is binarized as "bins" (SB00). Then, 1 is substituted into variable N (SB01).

Then, a probability value corresponding to a context index ctxIdx for the luma prediction mode (more specifically, index pStateIdx for referring to the probability value) is obtained (SB02). Then, arithmetic coding is performed on an Nth bit, based on the obtained probability value (SB03). The probability value (pStateIdx) corresponding to ctxIdxis updated based on whether the Nth coded bit is 0 or 1 (SB04).

If coding is not completed yet for all the bits (No in SB06), 1 is added to N (SB05), and the next bit is coded.

It should be noted that ctxIdx for a luma prediction mode is a predetermined index. In the arithmetic coding on an N-bit signal of the same type, a probability value (pStateIdx) corresponding to the same ctxIdx is used. More specifically, the probability value (pStateIdx) updated whenever one bit is coded is used for coding. When coding is completed for all the binary bits (Yes in SB06), processing ends.

In addition, intra_chroma_pred_mode which indicates a chroma prediction mode is obtained in variable-length bits for chroma, similarly. The first bit indicating intra_chroma_pred_mode is coded based on a probability value (pStateIdx) corresponding to ctxIdx derived according to the states of upper and left blocks. Subsequent bits are coded based on the probability value (pStateIdx) corresponding to predetermined ctxIdx. In addition, the probability value is updated after coding the first bit as with the case of luma.

Figure 2:
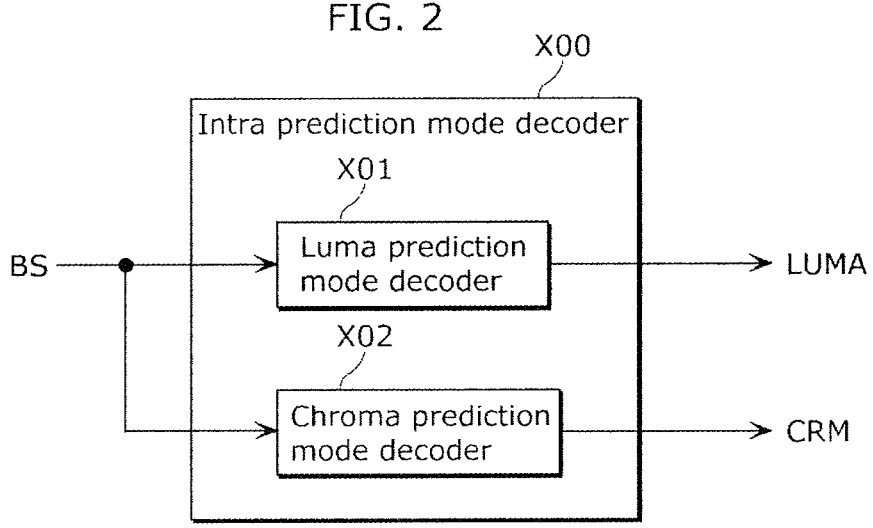
FIG. 2 is a block diagram illustrating an example of a configuration of an intra prediction mode decoder.
Figure 3:
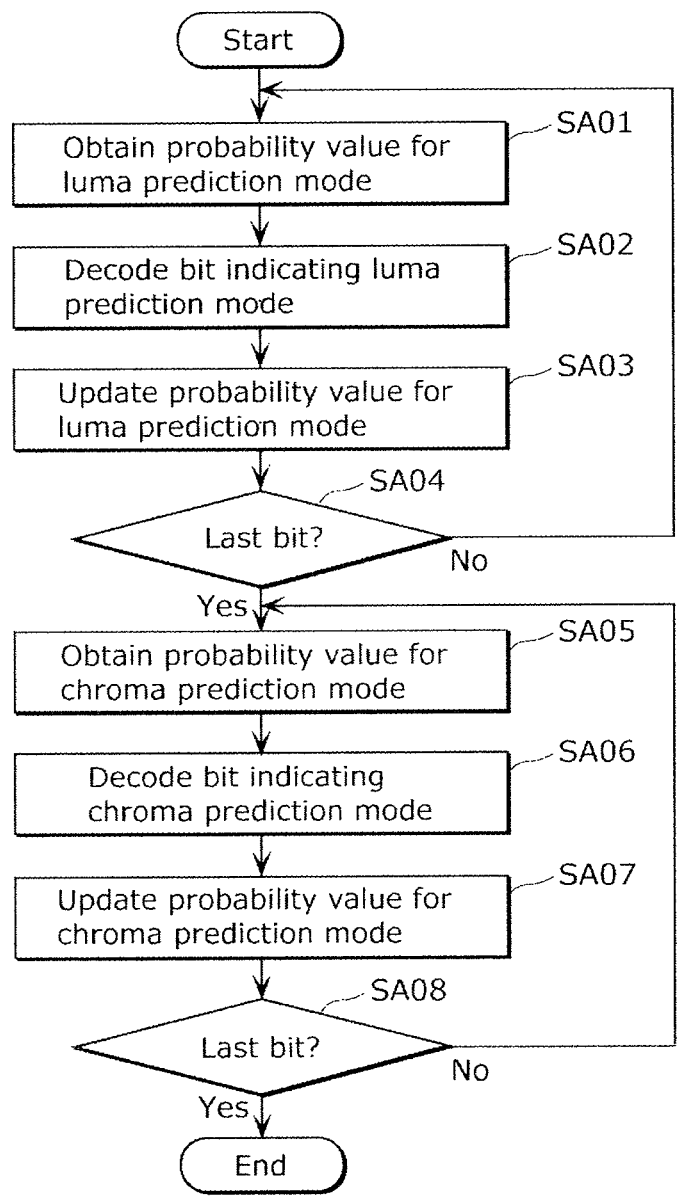
FIG. 3 is a flowchart illustrating decoding processing in an intra prediction mode.

The following is a description of variable-length decoding on a luma prediction mode and a chroma prediction mode, using FIGS. 2 and 3.

FIG. 2 is a block diagram illustrating an example of a configuration of an intra prediction mode decoder. FIG. 3 is a flowchart illustrating the operation of an intra prediction mode decoder X00 illustrated in FIG. 2.

First, a luma prediction mode decoder X01 obtains a bitstream BS, and a probability value for a luma prediction mode (SA01). Next, the luma prediction mode decoder X01 decodes a bit indicating the luma prediction mode, with reference to the obtained probability value (SA02). After that, the luma prediction mode decoder X01 updates the probability value, based on whether the decoded bit is 0 or 1 (SA03). It should be noted that the details of arithmetic decoding is described below.

If the decoded bit is not the last bit, or in other words, if the decoded bit is not the last bin (of a binary string) (No in SA04), the luma prediction mode decoder X01 obtains a probability value for the luma prediction mode, again. If the decoded bit is the last bit, the luma prediction mode decoder X01 ends decoding processing on the luma prediction mode, and starts decoding processing on a chroma prediction mode. It should be noted whether the decoded bit is the last bit is determined in accordance with a predetermined rule (described in NPL 2).

Next, a chroma prediction mode decoder X02 obtains the bitstream BS, and a probability value for a chroma prediction mode (SA05). Next, the chroma prediction mode decoder X02 decodes a bit indicating the chroma prediction mode with reference to the obtained probability value (SA06). After that, the chroma prediction mode decoder X02 updates the probability value, based on whether the decoded bit is 0 or 1 (SA07).

If the decoded bit is not the last bit (No in SA08), the chroma prediction mode decoder X02 obtains a probability value for the chroma prediction mode, again. If the decoded bit is the last bit, the chroma prediction mode decoder X02 ends decoding processing on the chroma prediction mode. It should be noted whether the decoded bit is the last bit is determined in accordance with a predetermined rule (described in NPL 2), as with the case of luma.

The following is a description of arithmetic decoding on a luma prediction mode and a chroma prediction mode. An example of a technique according to H.264 or HEVC is context adaptive binary arithmetic coding (CABAC). Arithmetic decoding on a luma prediction mode and a chroma prediction mode is executed based on CABAC. The following is a description of CABAC, using FIGS. 4, 5, and 6.

Figure 4:
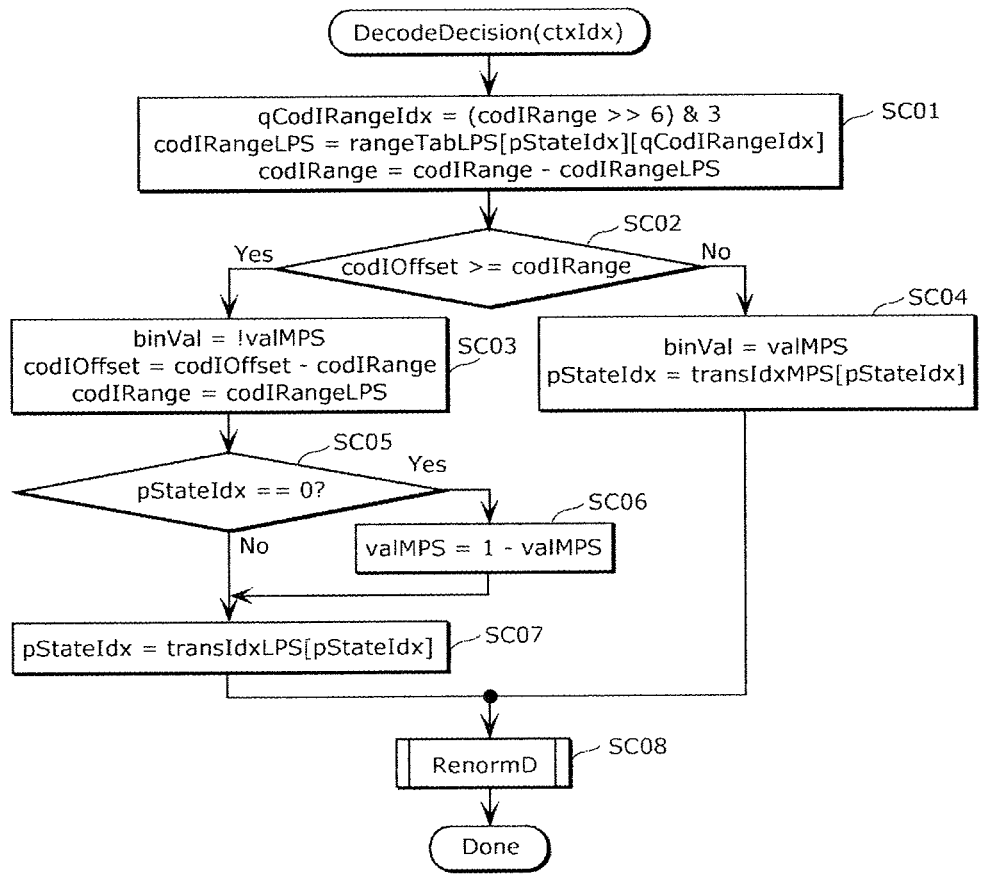
FIG. 4 is a flowchart illustrating context adaptive binary arithmetic decoding processing of an arithmetic decoding method.

FIG. 4 illustrates the flow of context adaptive binary arithmetic decoding processing. It should be noted that FIG. 4 is a diagram excerpted from NPL 1, and context adaptive binary arithmetic decoding processing is as described in NPL 1, unless specifically described.

In arithmetic decoding processing, a context index ctxIdx determined based on a signal type is inputted first.

Next, qCodIRangeIdx is derived from a first parameter codIRange that indicates the state of arithmetic decoding. Then, pStateIdx which is a state value corresponding to ctxIdx is obtained. Then, codIRangeLPS is obtained by referring to a table rangeTableLPS, using qCodIRangeIdx and pStateIdx.

It should be noted that this codIRangeLPS indicates a value corresponding to codIRange which indicates the state of arithmetic decoding when LPS (indicating a symbol 0 or 1 whose probability of occurrence is the lower) has occurred.

In addition, a value obtained by subtracting codIRangeLPS mentioned above from current codIRange is put in codIRange (SC01). Next, calculated codIRange and a second parameter codIOffset which indicates the state of arithmetic decoding are compared (SC02).

If codIOffset is equal to or greater than codIRange (Yes in SC02), it is determined that the symbol of LPS has occurred. Then, binVal which is a decoded output value is set to a value different from valMPS. Specifically, if valMPS=1, binVal is set to 0, and if valMPS=0, binVal is set to 1. It should be noted that valMPS is 0 or 1, which is a specific value of MPS which indicates a symbol 0 or 1 whose probability of occurrence is the higher.

Furthermore, the second parameter codIOffset which indicates the state of arithmetic decoding is set to a value obtained by subtracting codIRange from codIOffset. The first parameter codIRange which indicates the state of arithmetic decoding is set to the value of calculated codIRangeLPS (SC03).

If pStateIdx is 0 (Yes in SC05), the probability of LPS exceeds the probability of MPS. Accordingly, valMPS is changed. Specifically, if valMPS=1, 0 is put in valMPS, whereas if valMPS=0, 1 is put in valMPS (SC06). If pStateIdx is not 0 (No in SC05), valMPS is maintained. Then, pStateIdx is updated based on a transition table transIdxLPS corresponding to the case where LPS has occurred (SC07).

If codIOffset is smaller than codIRange (No in SC02), it is determined that the symbol of MPS has occurred. Then, valMPS is set to binVal which is a decoded output value. Furthermore, pStateIdx is updated based on a transition table transIdxMPS corresponding to the case where MPS has occurred (SC04).

Finally, normalizing processing (RenormD) is performed (SC08). Then, arithmetic decoding is completed.

In context adaptive binary arithmetic decoding processing, a context index corresponding to the symbol occurrence probability which is a probability of occurrence of a binary symbol is switched according to conditions. For example, a context index is switched according to the value of an adjacent block. Accordingly, the order of processing is maintained in context adaptive binary arithmetic decoding processing.

Figure 5:
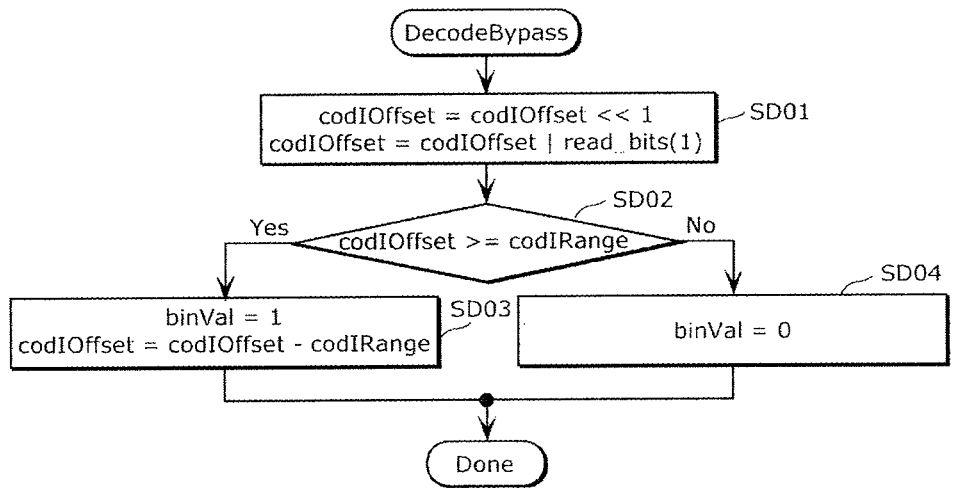
FIG. 5 is a flowchart illustrating bypass arithmetic decoding processing of the arithmetic decoding method.

FIG. 5 illustrates the flow of bypass arithmetic decoding processing (bypass decoding processing). It should be noted that FIG. 5 is a diagram excerpted from NPL 1, and bypass arithmetic decoding processing is as described in NPL 1, unless particularly described.

First, the second parameter codIOffset which indicates the state of arithmetic decoding is shifted to the left (doubled), and a bit is read from a bitstream. If the read bit is 1, 1 is added to the doubled codIOffset. If the read bit is 0, codIOffset is set to the as-is (doubled) value (SD01).

Next, if codIOffset is equal to or greater than the first parameter codIRange which indicates the state of arithmetic decoding (Yes in SD02), binVal which is a decoded output value is set to 1. Then, codIOffset is set to a value obtained by subtracting codIRange from codIOffset (SD03). If codIOffset is smaller than the first parameter codIRange which indicates the state of arithmetic decoding (No in SD02), binVal which is a decoded output value is set to 0 (SD04).

Figure 6:
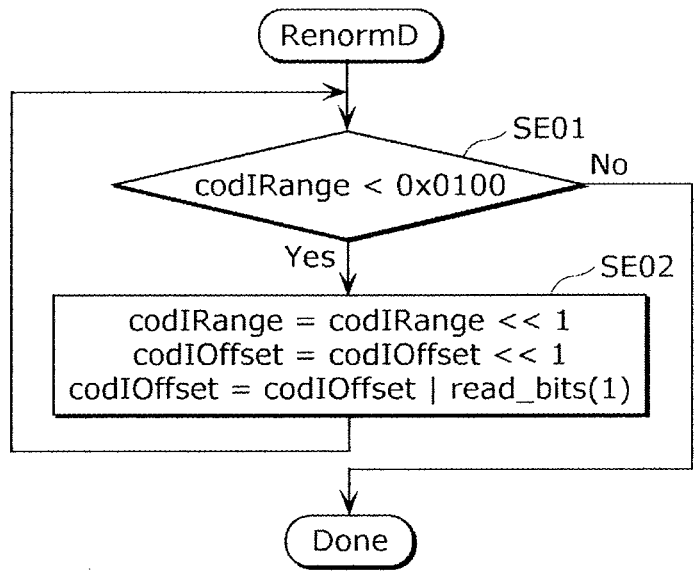
FIG. 6 is a flowchart illustrating normalizing processing of the arithmetic decoding method.

FIG. 6 is a flowchart for describing in detail normalizing processing (RenormD, SC08) in FIG. 4. FIG. 6 is a diagram excerpted from NPL 1, and normalizing processing is as described in NPL 1, unless particularly described.

First, it is determined whether the first parameter codIRange which indicates the state of arithmetic decoding is smaller than 0x100 in hexadecimal (256 in decimal) (SE01).

Then, if codIRange is smaller than 0x100 (Yes in SE01), codIRange is shifted to the left (doubled). In addition, the second parameter codIOffset which indicates the state of arithmetic decoding is shifted to the left. Then, a bit is read from a bitstream. If the read bit is 1, 1 is added to the doubled codIOffset. If the read bit is 0, codIOffset is set to the as-is (doubled) value (SE02).

The above processing is repeated, and when codIRange finally reaches 0x100 or more (No in SE01), normalizing processing ends.

Arithmetic decoding is performed on an intra prediction mode by performing processing illustrated in FIGS. 4, 5, and 6.

However, coding and decoding intra prediction modes may take time. For example, a code string for identifying a luma prediction mode and a chroma prediction mode which are respectively selected from among 34 luma prediction modes and 5 chroma prediction modes is not short. Decoding such a code string takes a comparatively long time. Thus, delay may occur noticeably as a whole by using a comparatively long time for each block.

Accordingly, in arithmetic coding and arithmetic decoding on intra prediction modes, an image coding method and an image decoding method are useful which prevent a decrease in coding efficiency and increase the degree of parallelism of processes.

In view of this, an image coding method according to an aspect of the present invention is an image coding method for coding an image using plural intra prediction modes, the image coding method including coding first binary data and second binary data, the first binary data indicating a first intra prediction mode used to code the image, the second binary data indicating a second intra prediction mode used to code the image, wherein in the coding, a first context adaptive portion and a second context adaptive portion are coded by context adaptive binary arithmetic coding, the first context adaptive portion being part of the first binary data, the second context adaptive portion being part of the second binary data, the context adaptive binary arithmetic coding being arithmetic coding using a variable probability updated based on coded data, a first bypass portion and a second bypass portion are coded by bypass coding, the first bypass portion being different part of the first binary data, the second bypass portion being different part of the second binary data, the bypass coding being arithmetic coding using a predetermined fixed probability, and coded data is generated which includes the first context adaptive portion, the second context adaptive portion, the first bypass portion, and the second bypass portion, the first bypass portion and the second bypass portion being included subsequent to the first context adaptive portion and the second context adaptive portion.

Consequently, coded data is generated in which plural portions for which bypass decoding is used are contiguous. Therefore, the degree of parallelism of decoding processing may increase. Thus, the intra prediction modes are coded efficiently.

For example, in the coding, the first binary data and the second binary data may be coded, the first binary data indicating the first intra prediction mode used to predict luma of the image, the second binary data indicating the second intra prediction mode used to predict chroma of the image.

Consequently, coded data is generated in which plural portions for which bypass decoding is used are made contiguous by a combination of a luma prediction mode and a chroma prediction mode. Therefore, the degree of parallelism of decoding processing may increase.

For example, in the coding, the coded data may be generated which includes the first context adaptive portion, the second context adaptive portion, the second bypass portion, and the first bypass portion, in order: the first context adaptive portion; the second context adaptive portion; the second bypass portion; and the first bypass portion.

Consequently, coded data is generated in which the second binary data pieces indicating the second intra prediction mode are contiguous. Therefore, the degree of complexity of processing is decreased.

For example, in the coding, when the second binary data does not include the second bypass portion, a whole of the second binary data may be coded, as the second context adaptive portion, by the context adaptive binary arithmetic coding to generate the coded data which does not include the second bypass portion.

Consequently, the second binary data is coded appropriately even if a portion for which bypass coding is used is not present in the second binary data indicating the second intra prediction mode.

For example, in the coding, the first binary data and the second binary data may be coded, the first binary data indicating the first intra prediction mode used to predict luma of a first block included in the image, the second binary data indicating the second intra prediction mode used to predict luma of a second block included in the image.

Consequently, coded data is generated in which plural portions for which bypass decoding is used are made contiguous by a combination of plural luma prediction modes. Therefore, the degree of parallelism of decoding processing may increase.

For example, in the coding, the second binary data may be coded which indicates the second intra prediction mode used to predict chroma of a block included in the image, the first binary data, third binary data, fourth binary data, and fifth binary data may be coded which respectively indicate the first intra prediction mode, a third intra prediction mode, a fourth intra prediction mode, and a fifth intra prediction mode which are used to predict luma of four subblocks constituting the block, when the third binary data, the fourth binary data, and the fifth binary data are coded, a third context adaptive portion of the third binary data, a fourth context adaptive portion of the fourth binary data, and a fifth context adaptive portion of the fifth binary data may be coded by the context adaptive binary arithmetic coding, and a third bypass portion of the third binary data, a fourth bypass portion of the fourth binary data, and a fifth bypass portion of the fifth binary data may be coded by the bypass coding, and the coded data may be generated which includes the first context adaptive portion, the third context adaptive portion, the fourth context adaptive portion, the fifth context adaptive portion, the second context adaptive portion, the second bypass portion, the first bypass portion, the third bypass portion, the fourth bypass portion, and the fifth bypass portion, in order: the first context adaptive portion; the third context adaptive portion; the fourth context adaptive portion; the fifth context adaptive portion; the second context adaptive portion; the second bypass portion; the first bypass portion; the third bypass portion; the fourth bypass portion; and the fifth bypass portion.

Consequently, even if four luma prediction modes and one chroma prediction mode are used to predict a block, coded data is generated in which plural portions for which bypass decoding is used are contiguous. Therefore, the degree of parallelism of decoding processing may increase.

For example, in the coding, the first bypass portion and the second bypass portion may be coded in parallel.

Consequently, plural portions for which bypass coding is used are coded in parallel. Therefore, plural intra prediction modes are coded efficiently.

For example, in the coding, a switch may be made to one of first coding processing conforming to a first standard and second coding processing conforming to a second standard, and a bitstream may be generated which includes identification information indicating the first standard or the second standard to which the one of the first coding processing and the second coding processing conforms, and when the switch is made to the first coding processing, the coded data may be generated which includes the first bypass portion and the second bypass portion subsequent to the first context adaptive portion and the second context adaptive portion, and the bitstream may be generated which includes the identification information and the coded data.

Consequently, a decoding apparatus is notified of the format of coding processing. Thus, the decoding apparatus can appropriately switch decoding processing.

An image decoding method according to an aspect of the present invention may be an image decoding method for decoding an image using plural intra prediction modes, the image decoding method including decoding first binary data and second binary data, the first binary data indicating a first intra prediction mode to be used to decode the image, the second binary data indicating a second intra prediction mode to be used to decode the image, wherein in the decoding, coded data is obtained which includes a first context adaptive portion, a second context adaptive portion, a first bypass portion, and a second bypass portion, the first context adaptive portion being part of the first binary data, the second context adaptive portion being part of the second binary data, the first bypass portion being different part of the first binary data, the second bypass portion being different part of the second binary data, the first bypass portion and the second bypass portion being included subsequent to the first context adaptive portion and the second context adaptive portion, the first context adaptive portion and the second context adaptive portion are decoded by context adaptive binary arithmetic decoding which is arithmetic decoding using a variable probability updated based on decoded data, and the first bypass portion and the second bypass portion are decoded by bypass decoding which is arithmetic decoding using a predetermined fixed probability.

Consequently, coded data is obtained in which plural portions for which bypass decoding is used are contiguous. Therefore, the degree of parallelism of decoding processing may increase. Thus, intra prediction modes are decoded efficiently.

For example, in the decoding, the first binary data and the second binary data may be decoded, the first binary data indicating the first intra prediction mode to be used to predict luma of the image, the second binary data indicating the second intra prediction mode to be used to predict chroma of the image.

Consequently, coded data is obtained in which plural portions for which bypass decoding is used are made contiguous by a combination of a luma intra prediction mode and a chroma intra prediction mode. Therefore, the degree of parallelism of decoding processing may increase.

For example, in the decoding, the coded data may be obtained which includes the first context adaptive portion, the second context adaptive portion, the second bypass portion, and the first bypass portion, in order: the first context adaptive portion; the second context adaptive portion; the second bypass portion; and the first bypass portion.

Consequently, coded data is obtained in which the second binary data pieces indicating the second intra prediction mode are contiguous. Therefore, the degree of complexity of processing is decreased.

For example, in the decoding, when the obtained coded data does not include the second bypass portion, the second context adaptive portion may be decoded by the context adaptive binary arithmetic decoding, to decode a whole of the second binary data.

Consequently, the second binary data is decoded appropriately even if a portion for which bypass decoding is used is not present in the second binary data indicating the second intra prediction mode.

For example, in the decoding, the first binary data and the second binary data may be decoded, the first binary data indicating the first intra prediction mode to be used to predict luma of a first block included in the image, the second binary data indicating the second intra prediction mode to be used to predict luma of a second block included in the image.

Consequently, coded data is obtained in which plural portions for which bypass decoding is used are made contiguous by a combination of plural luma prediction modes. Therefore, the degree of parallelism of decoding processing may increase.

For example, in the decoding, the second binary data may be decoded which indicates the second intra prediction mode to be used to predict chroma of a block included in the image, the first binary data, third binary data, fourth binary data, and fifth binary data may be decoded which respectively indicate the first intra prediction mode, a third intra prediction mode, a fourth intra prediction mode, and a fifth intra prediction mode which are to be used to predict luma of four subblocks constituting the block, when the third binary data, the fourth binary data, and the fifth binary data are decoded, a third context adaptive portion of the third binary data, a fourth context adaptive portion of the fourth binary data, and a fifth context adaptive portion of the fifth binary data may be decoded by the context adaptive binary arithmetic decoding, and a third bypass portion of the third binary data, a fourth bypass portion of the fourth binary data, and a fifth bypass portion of the fifth binary data may be decoded by the bypass decoding, and when the coded data is obtained, the coded data may be obtained which includes the first context adaptive portion, the third context adaptive portion, the fourth context adaptive portion, the fifth context adaptive portion, the second context adaptive portion, the second bypass portion, the first bypass portion, the third bypass portion, the fourth bypass portion, and the fifth bypass portion, in order: the first context adaptive portion; the third context adaptive portion; the fourth context adaptive portion; the fifth context adaptive portion; the second context adaptive portion; the second bypass portion; the first bypass portion; the third bypass portion; the fourth bypass portion; and the fifth bypass portion.

Consequently, coded data is obtained in which plural portions for which bypass decoding is used are contiguous even if four luma prediction modes and one chroma prediction mode are used to predict a block. Therefore, the degree of parallelism of decoding processing may increase.

For example, in the decoding, the first bypass portion and the second bypass portion may be decoded in parallel.

Consequently, plural portions for which bypass decoding is used are decoded in parallel. Therefore, plural intra prediction modes are decoded efficiently.

For example, in the decoding, a bitstream may be obtained which includes identification information indicating a first standard or a second standard, and based on the identification information, a switch may be made to one of first decoding processing conforming to the first standard and second decoding processing conforming to the second standard, and when the switch is made to the first decoding processing, the coded data may be obtained from the bitstream, the coded data including the first bypass portion and the second bypass portion subsequent to the first context adaptive portion and the second context adaptive portion.

Consequently, decoding processing can be switched appropriately based on the format of coding processing performed by a coding apparatus.

Furthermore, these general and specific embodiments may be implemented using an apparatus, a system, an integrated circuit, a computer program, or a non-transitory computer-readable recording medium such as a CD-ROM, or an arbitrary combination of apparatuses, systems, methods, integrated circuits, computer programs, or recording media.

The following is a specific description of an image coding method and an image decoding method according to an aspect of the present invention, with reference to the drawings. Each of the embodiments described below shows a specific example of the present invention. The numerical values, shapes, materials, constituent elements, the arrangement and connection of the constituent elements, steps, the processing order of the steps, and the like shown in the following embodiments are mere examples, and are not intended to limit the present invention. Therefore, among the constituent elements in the embodiments below, constituent elements not recited in any of the independent claims defining the broadest concept are described as arbitrary constituent elements.

Embodiment 1

Figure 7:
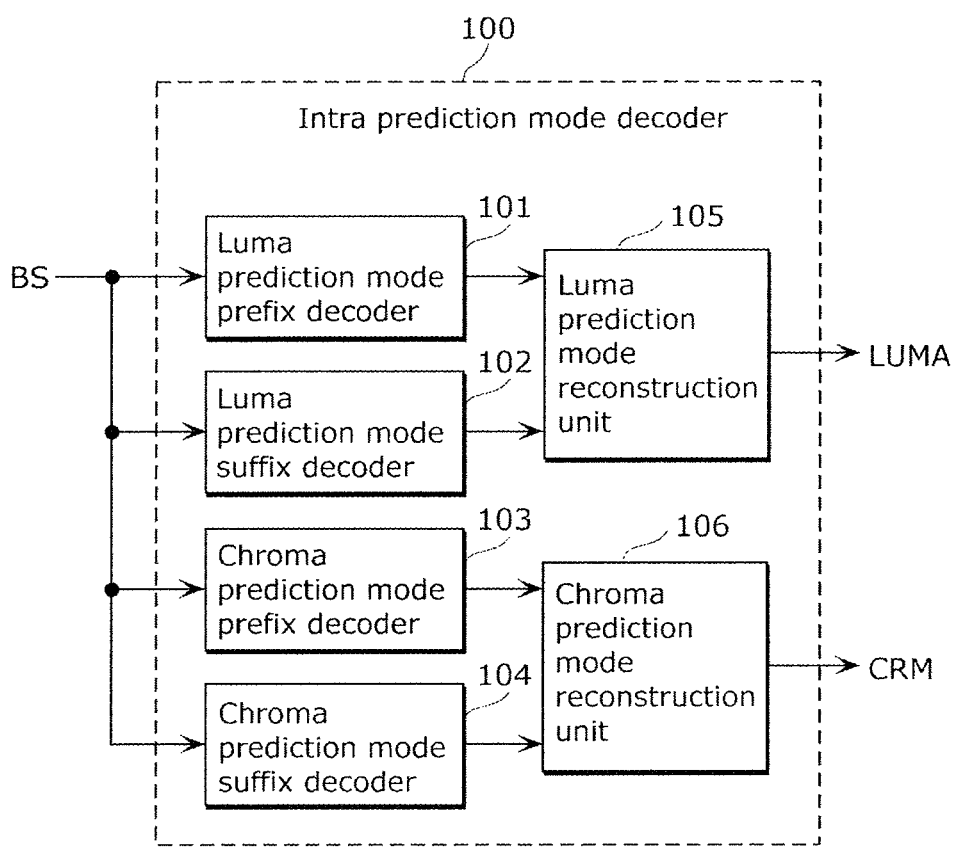
FIG. 7 is a block diagram illustrating a configuration of an intra prediction mode decoder according to Embodiment 1.

FIG. 7 is a block diagram illustrating a configuration of an intra prediction mode decoder which performs variable-length decoding on a luma prediction mode and a chroma prediction mode which are intra prediction modes corresponding to luma and chroma according to Embodiment 1.

An intra prediction mode decoder 100 according to the present embodiment is constituted by a luma prediction mode prefix decoder 101, a luma prediction mode suffix decoder 102, a chroma prediction mode prefix decoder 103, a chroma prediction mode suffix decoder 104, a luma prediction mode reconstruction unit 105, and a chroma prediction mode reconstruction unit 106. The intra prediction mode decoder 100 reconstructs, from a bitstream BS, a luma prediction mode LUMA and a chroma prediction mode CRM.

Figure 8:
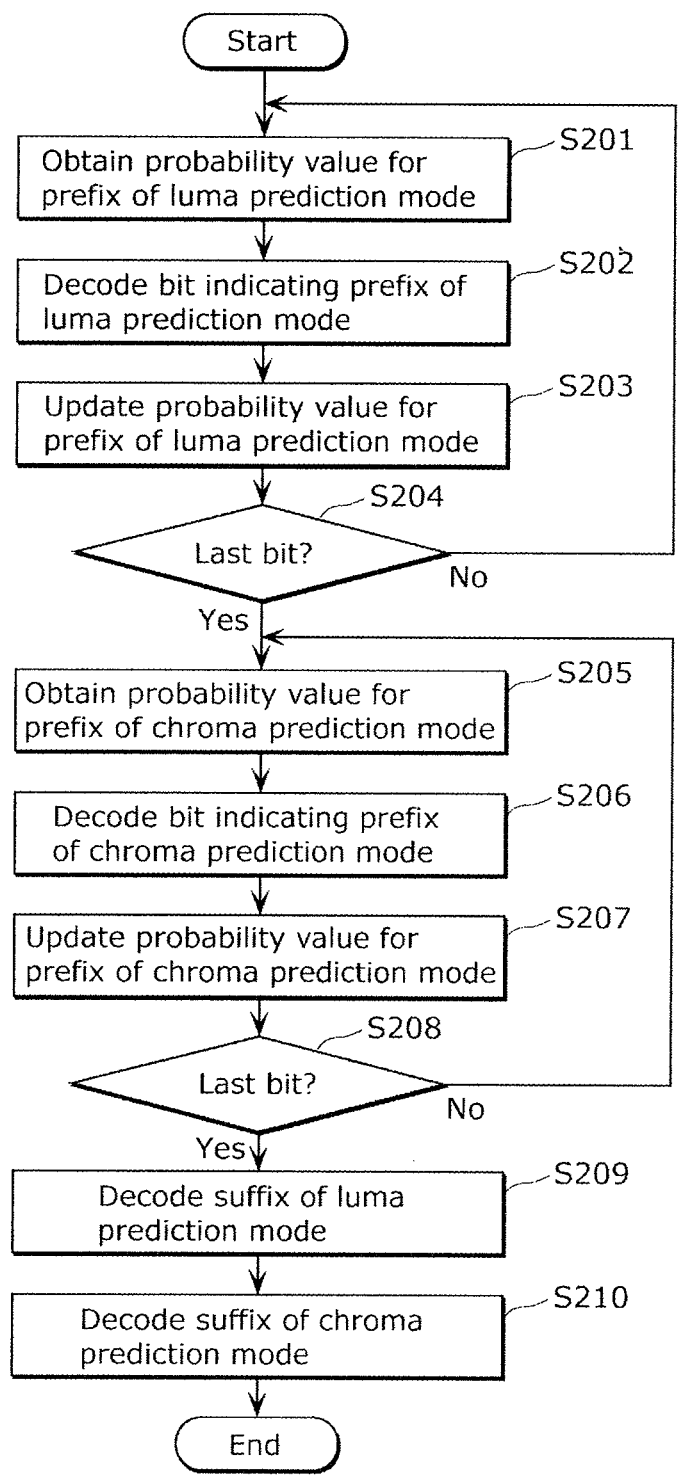
FIG. 8 is a flowchart illustrating processing by the intra prediction mode decoder according to Embodiment 1.

A detailed description is given of the operation of the intra prediction mode decoder 100 according to the present embodiment, using FIG. 8. FIG. 8 is a flowchart illustrating the operation of the intra prediction mode decoder 100.

The intra prediction mode decoder 100 obtains a bitstream BS. Then, the luma prediction mode prefix decoder 101 obtains a probability value for the prefix of a luma prediction mode (S201). This probability value is identified by a context index ctxIdx predetermined for the prefix of the luma prediction mode.

Next, the luma prediction mode prefix decoder 101 decodes a bit indicating the prefix of the luma prediction mode, with reference to the obtained probability value (S202). After that, the luma prediction mode prefix decoder 101 updates the probability value, based on whether the decoded bit is 0 or 1 (S203). It should be noted that for arithmetic decoding, the method described above may be used, or a method modified to increase efficiency may be used.

If the decoded bit is not the last bit, or specifically, if the decoded bit is not the last bin (of a binary string) (No in S204), the luma prediction mode prefix decoder 101 obtains a probability value for the prefix of the luma prediction mode, again. On the other hand, if the decoded bit is the last bit, the intra prediction mode decoder 100 ends decoding processing on the prefix of the luma prediction mode, and starts decoding processing on the prefix of a chroma prediction mode.

It should be noted whether the decoded bit is the last bit is determined in accordance with a predetermined rule. For example, whether the decoded bit is the last bit may be determined according to the bin length, or may be determined according to the value of bin (0 or 1 obtained by decoding, for instance). If the bin length is 1, processing is simplified, and high speed processing is expected. If the value of bin is used for the determination, an increase in coding efficiency is expected since efficient control of the bin length is possible.

Next, the chroma prediction mode prefix decoder 103 obtains the bitstream BS, and obtains a probability value for the prefix of the chroma prediction mode (S205). This probability value is identified by a context index ctxIdx predetermined for the prefix of the chroma prediction mode.

Next, the chroma prediction mode prefix decoder 103 decodes a bit indicating the prefix of the chroma prediction mode, with reference to the obtained probability value (S206). After that, the chroma prediction mode prefix decoder 103 updates the probability value, based on whether the decoded bit is 0 or 1 (S207).

If the decoded bit is not the last bit, or in other words, if the decoded bit is not the last bin (of a binary string) (No in S208), the chroma prediction mode prefix decoder 103 obtains a probability value for the prefix of the chroma prediction mode, again. If the decoded bit is the last bit, the intra prediction mode decoder 100 ends decoding processing on the prefix of the chroma prediction mode. It should be noted whether the decoded bit is the last bit is determined in accordance with a predetermined rule as with the case of luma.

Next, the luma prediction mode suffix decoder 102 performs decoding processing on the suffix of the luma prediction mode (S209). Decoding processing on the suffix of the luma prediction mode corresponds to bypass processing of arithmetic decoding. Although probability is updated in decoding processing on the prefix of a luma prediction mode, probability is not updated in decoding processing on the suffix of a luma prediction mode. Therefore, high speed processing and parallel processing can be performed on the suffix of a luma prediction mode.

Next, the chroma prediction mode suffix decoder 104 performs decoding processing on the suffix of the chroma prediction mode (S210). Decoding processing on the suffix of the chroma prediction mode corresponds to bypass processing of arithmetic decoding, similarly. Although probability is updated in decoding processing on the prefix of a chroma prediction mode, probability is not updated in decoding processing on the suffix of a chroma prediction mode. Therefore, high speed processing and parallel processing can be performed on the suffix of a chroma prediction mode.

Finally, the luma prediction mode reconstruction unit 105 reconstructs the luma prediction mode LUMA from the prefix of the luma prediction mode and the suffix of the luma prediction mode. In addition, the chroma prediction mode reconstruction unit 106 reconstructs the chroma prediction mode CRM from the prefix of the chroma prediction mode and the suffix of the chroma prediction mode.

It should be noted that a prefix corresponds to a portion in which a frequency of symbol occurrence greatly varies. Accordingly, coding efficiency increases by coding a prefix by context adaptive binary arithmetic coding. Then, at the time of decoding, context adaptive binary arithmetic decoding (FIG. 4) is executed.

A suffix is designed as a portion corresponding to a great index value. Accordingly, the range of the value indicated by a suffix is great. Thus, the variation of frequency of symbol occurrence is small in a binary code string corresponding to a suffix. Therefore, the probability of symbol occurrence is assumed to be 50%. Thus, the amount of processing is reduced due to bypass coding. Then, bypass decoding (FIG. 5) is executed when decoding a suffix.

Normalizing processing is executed in accordance with the flow illustrated in FIG. 6. The following is a description of an example of operation of decoding processing illustrated in FIG. 8, using FIG. 9.

Figure 9:
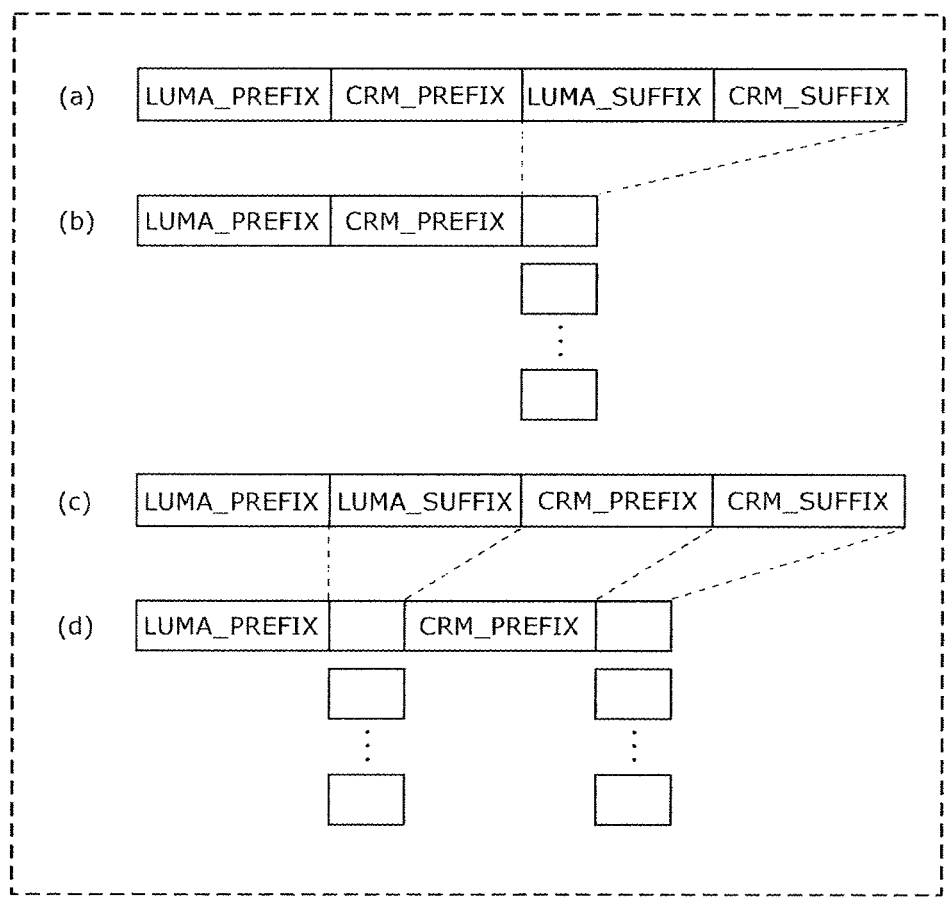
FIG. 9 illustrates an example of operation according to Embodiment 1.

FIG. 9 is a diagram for describing operation according to Embodiment 1. Part (a) of FIG. 9 illustrates an example in the case where plural processes are sequentially executed. These processes are performed in the following order: decoding processing on the prefix of a luma prediction mode (LUMA_PREFIX); decoding processing on the prefix of a chroma prediction mode (CRM_PREFIX); decoding processing on the suffix of the luma prediction mode (LUMA_SUFFIX); and decoding processing on the suffix of the chroma prediction mode (CRM_SUFFIX).

However, processing is performed in parallel to increase the speed, while image resolution utilized is increased, and high-speed real time communication is widely used. However, context adaptive binary arithmetic decoding processing is used for decoding processing on the prefix. Consequently, reading processing and update processing on the probability of symbol occurrence are performed sequentially. Therefore, decoding processing on the prefix is not performed in parallel. In contrast, decoding processing on the suffix can be performed in parallel bitwise, as illustrated in (b) of FIG. 9.

Parts (c) and (d) of FIG. 9 illustrate examples in the case where prefixes and suffixes of bitstreams are decoded in which a chroma prediction mode is coded subsequent to a luma prediction mode. Part (c) of FIG. 9 corresponds to (a) of FIG. 9, and (d) of FIG. 9 corresponds to (b) of FIG. 9.

Also, in this case, prefixes are sequentially processed, similarly. In addition, as in (b) of FIG. 9, suffixes can be processed in parallel bitwise. However, a suffix of the luma prediction mode and a suffix of the chroma prediction mode are not put together. Accordingly, the portions which can be processed in parallel are interrupted. Consequently, the degree of parallelism is comparatively low.

The order in (c) and (d) of FIG. 9 has an advantage that reconstruction of the intra prediction modes is possible although prefixes of the intra prediction modes are not temporarily stored. However, the order in (a) and (b) of FIG. 9 is more suitable for high speed processing than the order in (c) and (d) of FIG. 9.

Figure 10:
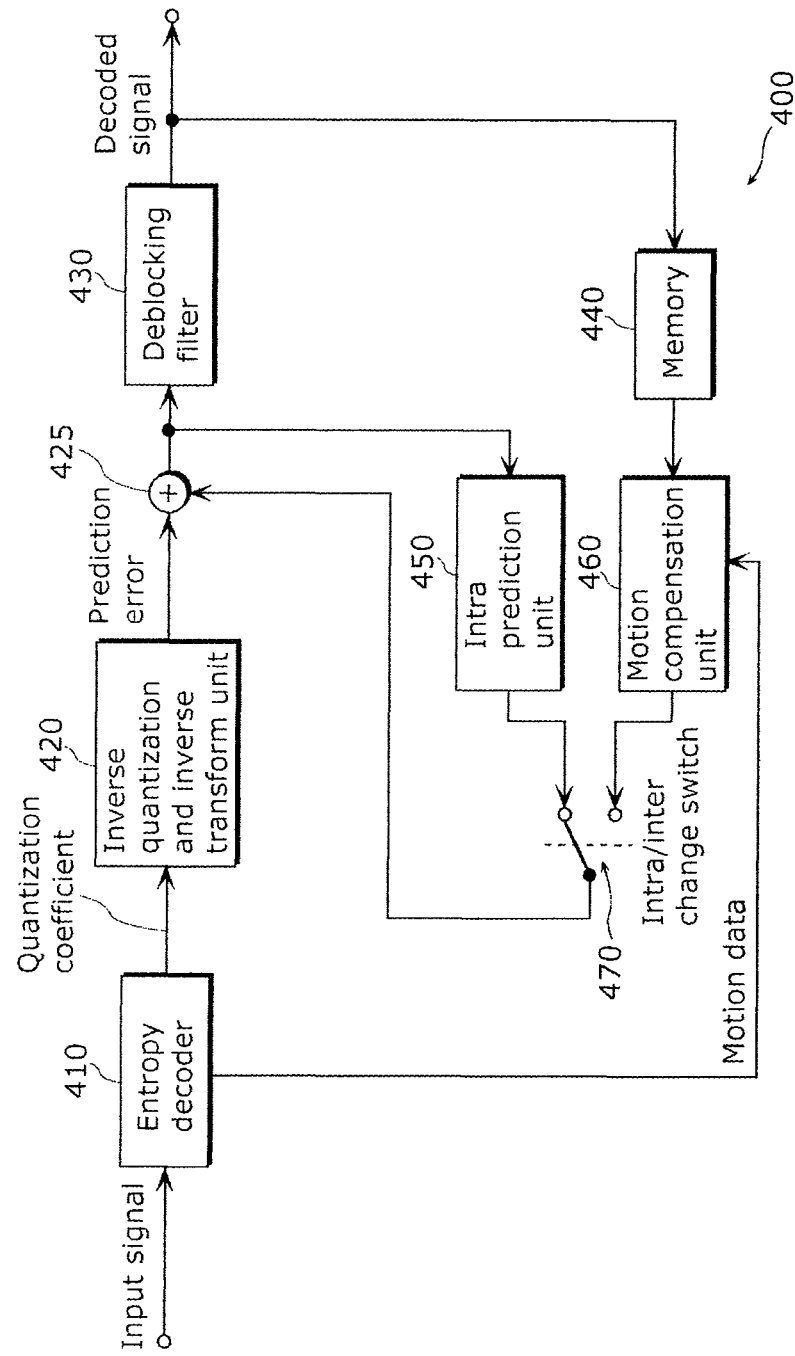
FIG. 10 is a block diagram illustrating an example of a configuration of an image decoding apparatus according to Embodiment 1.

It should be noted that the intra prediction mode decoder 100 according to Embodiment 1 is included in an image decoding apparatus which decodes coded image data. FIG. 10 is a block diagram illustrating an example of a configuration of an image decoding apparatus according to Embodiment 1.

An image decoding apparatus 400 illustrated in FIG. 10 decodes coded image data. For example, coded image data is inputted, on a block-by-block basis, to the image decoding apparatus 400 as signals to be decoded. The image decoding apparatus 400 reconstructs image data by performing variable length decoding, inverse quantization, and inverse transform on the inputted decoding target signals.

As illustrated in FIG. 10, the image decoding apparatus 400 includes an entropy decoder 410, an inverse quantization and inverse transform unit 420, an adder 425, a deblocking filter 430, a memory 440, an intra prediction unit 450, a motion compensation unit 460, and an intra/inter change switch 470.

The entropy decoder 410 performs variable length decoding on an input signal (input stream), to reconstruct a quantization coefficient. It should be noted that here, an input signal (input stream) is a signal to be decoded, and corresponds to coded image data for each block. Further, the entropy decoder 410 obtains motion data from the input signal, and outputs the obtained motion data to the motion compensation unit 460.

The inverse quantization and inverse transform unit 420 performs inverse quantization on the quantization coefficient reconstructed by the entropy decoder 410, to reconstruct a transform coefficient. Then, the inverse quantization and inverse transform unit 420 performs inverse transform on the reconstructed transform coefficient, to reconstruct a prediction error.

The adder 425 adds the reconstructed prediction error to a predicted signal, to generate a decoded image.

The deblocking filter 430 performs deblocking filter processing on the generated decoded image. The decoded image on which deblocking filter processing has been performed is outputted as a decoded signal.

The memory 440 is a memory for storing reference images used for motion compensation. Specifically, the memory 440 stores decoded images on which deblocking filter processing has been performed.

The intra prediction unit 450 generates a predicted signal (intra-predicted signal) by performing intra prediction in accordance with an intra prediction mode. Specifically, the intra prediction unit 450 performs intra prediction by referring to an image around a current block to be decoded (input signal) in the decoded image generated by the adder 425, to generate an intra-predicted signal.

The motion compensation unit 460 performs motion compensation, based on motion data outputted from the entropy decoder 410, to generate a predicted signal (inter-predicted signal).

The intra/inter change switch 470 selects either one of the intra-predicted signal and the inter-predicted signal, and outputs the selected signal to the adder 425 as a predicted signal.

The above configuration allows the image decoding apparatus 400 according to Embodiment 1 to decode coded image data.

It should be noted that the image decoding apparatus 400 includes the intra prediction mode decoder 100 according to Embodiment 1 in the entropy decoder 410.

As described above, according to the image decoding apparatus and the image decoding method according to Embodiment 1, intra prediction modes are reconstructed at high speed. Specifically, as described in Embodiment 1, a context adaptive portion of a luma prediction mode and a context adaptive portion of a chroma prediction mode are combined, and a bypass portion of a luma prediction mode and a bypass portion of a chroma prediction mode are combined. Accordingly, plural portions which can be processed in parallel are contiguous. Thus, parallel processing, or in other words, high-speed decoding can be performed.

It should be noted that although the above description mainly focuses on decoding processing on a suffix of a luma prediction mode and a suffix of a chroma prediction mode, the present invention is not limited to this. For example, simply, plural luma prediction modes are separated into prefixes and suffixes so as to be separately subjected to decoding processing, and plural chroma prediction modes may be separated into prefixes and suffixes so as to be separately subjected to decoding processing. This also allows the effect of reducing a certain amount of processing to be expected.

In this case, it is possible to decrease the internal memory size. In addition, an effect of high speed processing is also expected in this case since plural contiguous portions on which bypass processing is performed are generated.

It should be noted that as a binary string of an intra prediction mode, a Huffman code (binary string) may be derived based on the frequency of the occurrence of the intra prediction mode. Then, a table in which intra prediction modes and Huffman codes are associated may be generated. Also, a portion in which the probability of symbol occurrence of Huffman codes varies may be selected as a prefix. The degree of parallelism increases by determining a binary string and a prefix in this manner, resulting in a further increase in the speed of decoding processing.

In addition, in the present embodiment, although a luma prediction mode and a chroma prediction mode are combined, rem_intra_luma_pred_mode of a luma prediction mode and an intra_chroma_pred_mode of a chroma prediction mode may be combined.

Variation of Embodiment 1

In Embodiment 1, a prefix corresponding to context adaptive binary arithmetic decoding processing and a suffix corresponding to bypass decoding processing are separated irrespective of a luma prediction mode and a chroma prediction mode. Thus, the processing speed is increased. Furthermore, Embodiment 1 may be changed as follows. A detailed description is given of a variation of Embodiment 1, using FIGS. 11, 12, 13, and 14.

Figures 11, 12:
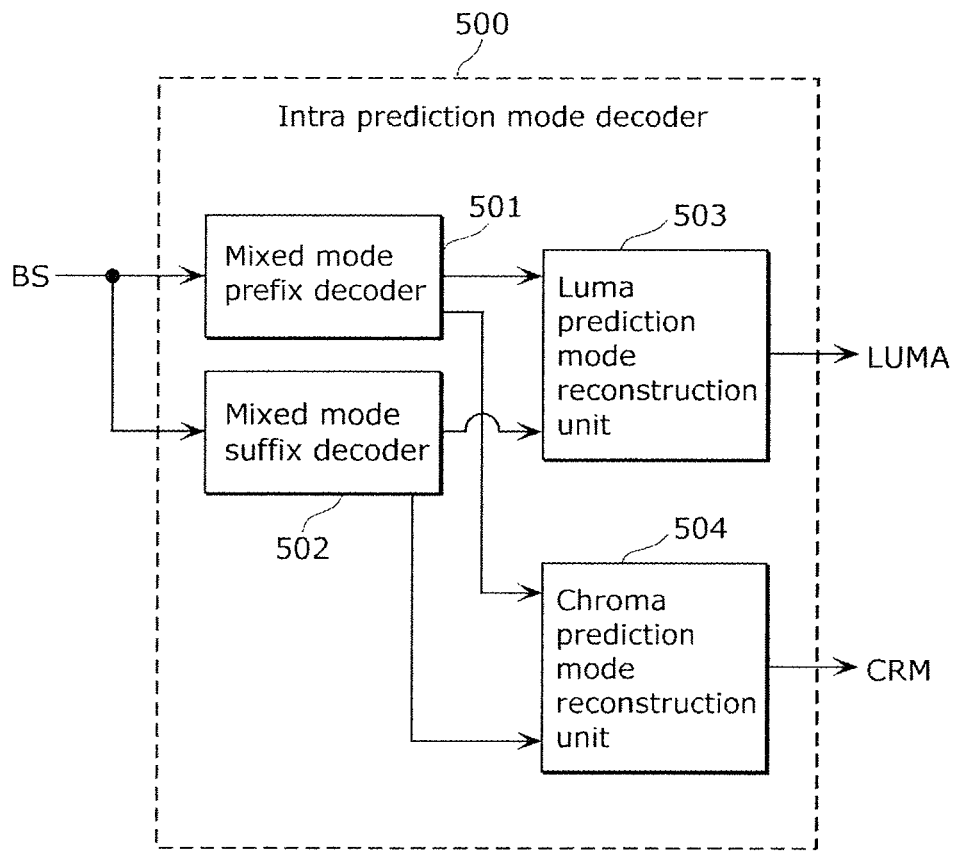
FIG. 11 is a block diagram illustrating a configuration of an intra prediction mode decoder according to a variation of Embodiment 1.
FIG. 12 illustrates examples of binary code strings according to the variation of Embodiment 1.
Figure 13:
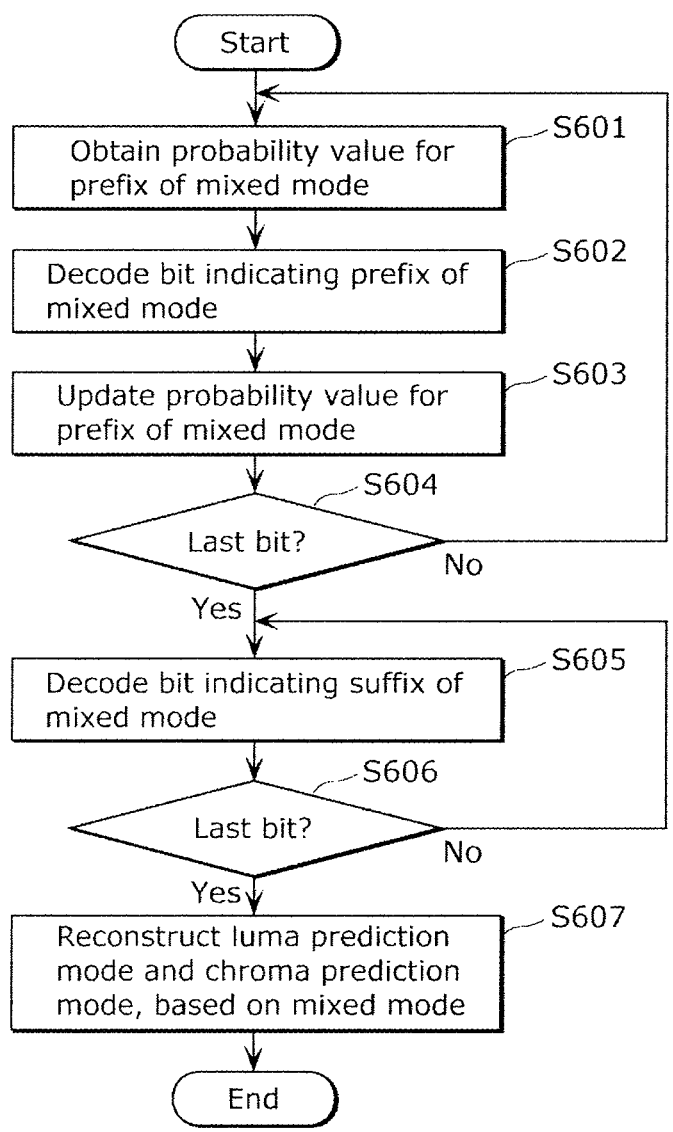
FIG. 13 is a flowchart illustrating processing by the intra prediction mode decoder according to the variation of Embodiment 1.

FIG. 11 is a block diagram illustrating an example of a configuration of an intra prediction mode decoder according to the variation of Embodiment 1. FIG. 12 illustrates examples of indexes JOINT_IDX indicating combinations of luma prediction modes and chroma prediction modes, and examples of binary strings corresponding to the indexes. FIG. 13 is a flowchart illustrating processing by an intra prediction mode decoder 500 illustrated in FIG. 11.

In Embodiment 1, different binary strings are used for luma prediction modes and chroma prediction modes. However, in the variation of Embodiment 1, indexes and binary strings corresponding to combinations of luma prediction modes and chroma prediction modes further increases coding efficiency and the speed of decoding processing.

For example, as illustrated in FIG. 12, a binary code (0 or 1) is assigned to each of the indexes JOINT_IDX corresponding to combinations of luma prediction modes and chroma prediction modes. Hereinafter, a combination of a luma prediction mode and a chroma prediction mode is also referred to as a mixed mode.

If the occurrence frequency of a combination is high, an index JOINT_IDX indicating a small value is assigned to the combination, whereas if the occurrence frequency of a combination is low, an index JOINT_IDX indicating a great value is assigned to the combination.

For example, only the first bit (bin 0) may be predetermined to be a prefix. Alternatively, the first bit (bin 0) to the sixth bit (bin 5) may be predetermined to be a prefix.

In Embodiment 1, a luma prediction mode and a chroma prediction mode are processed independently, based on different occurrence frequencies. In the variation of Embodiment 1, a combination of a luma prediction mode and a chroma prediction mode increases coding efficiency, and bypass portions are not separated. Thus, high speed processing is possible.

A mixed mode prefix decoder 501 obtains a probability value for the prefix of a mixed mode (S601). This probability value is identified by a context index ctxIdx predetermined for the prefix of a mixed mode. Next, a bit indicating the prefix of the mixed mode is decoded, with reference to the obtained probability value (S602). After that, the mixed mode prefix decoder 501 updates the probability value, based on whether the decoded bit is 0 or 1 (S603). It should be noted that for arithmetic decoding, the method described above may be used, or a method modified to improve efficiency may be used.

If the decoded bit is not the last bit, or in other words, if the decoded bit is not the last of bin (of a binary string) (No in S604), the mixed mode prefix decoder 501 obtains a probability value for the prefix of the mixed mode again. If the decoded bit is the last bit, the intra prediction mode decoder 500 ends decoding processing on the prefix of the mixed mode, and starts decoding processing on the suffix of the mixed mode.

It should be noted whether the decoded bit is the last bit may be determined based on the bin length illustrated in FIG. 12. In this case, an increase in coding efficiency is expected since control corresponding to the performance is possible. It should be noted that as an example of control of a prefix, a prefix may be changed according to the size of a prediction unit (the size of a block). For example, in the case of a large block, a prefix may be long since processing time is long enough. In contrast, in the case of a small block, a prefix may be short since the number of intra prediction modes is small.

Next, a mixed mode suffix decoder 502 obtains the bitstream BS, and performs decoding processing on the suffix of the mixed mode. It should be noted that decoding processing on the suffix of the mixed mode corresponds to bypass processing of arithmetic decoding. Although a probability is updated in decoding processing on the prefix of a mixed mode, a probability is not updated in decoding processing on the suffix of a mixed mode. Therefore, high speed processing and parallel processing are possible on the suffix of a mixed mode.

Specifically, the mixed mode suffix decoder 502 decodes a bit indicating the suffix of the mixed mode (S605). The mixed mode suffix decoder 502 repeats this processing up to the last bit (S606). In addition, the mixed mode suffix decoder 502 may decode plural bits indicating the suffix of a mixed mode in parallel.

After that, based on the mixed mode constituted by a prefix and a suffix, a luma prediction mode reconstruction unit 503 reconstructs a luma prediction mode, and a chroma prediction mode reconstruction unit 504 reconstructs a chroma prediction mode (S607).

It should be noted that the correspondence table illustrated in FIG. 12 is an example. In this example, it is assumed that the occurrence frequency increases linearly. It should be noted that the present embodiment is not limited to this, and binary strings obtained by Exp-Golomb may be used, for example. A correspondence table may be determined based on occurrence frequencies. Thus, coding efficiency further improves. In this variation, high speed processing is also achieved, and coding efficiency also increases.

FIG. 14 illustrates an example of a data structure. For example, data may be constituted in the order shown in FIG. 14. It should be noted that in FIG. 14, rem_intraiuma_pred_mode indicating a luma prediction mode and intra_chroma_pred_mode indicating a chroma prediction mode are combined. Thus, a mixed mode is included as Intra_combo_pred_mode in FIG. 14.

Embodiment 2

The outline of an arithmetic coding method according to the present embodiment is now described. An arithmetic coding method according to the present embodiment has a feature that rather than separately coding a luma prediction mode and a chroma prediction mode, a prefix corresponding to context adaptive binary arithmetic coding and a suffix corresponding to bypass coding are coded separately. Accordingly, the degree of parallelism increases, and the processing speed is increased as a whole.

The above is a description of the outline of the arithmetic coding method according to the present embodiment. The configuration and the processing disclosed in NPLs 1 and 2 may be used for the configuration and processing which is not described herein in particular. The following is a description of the flow of processing of intra prediction mode coding according to the present embodiment.

Figure 15:
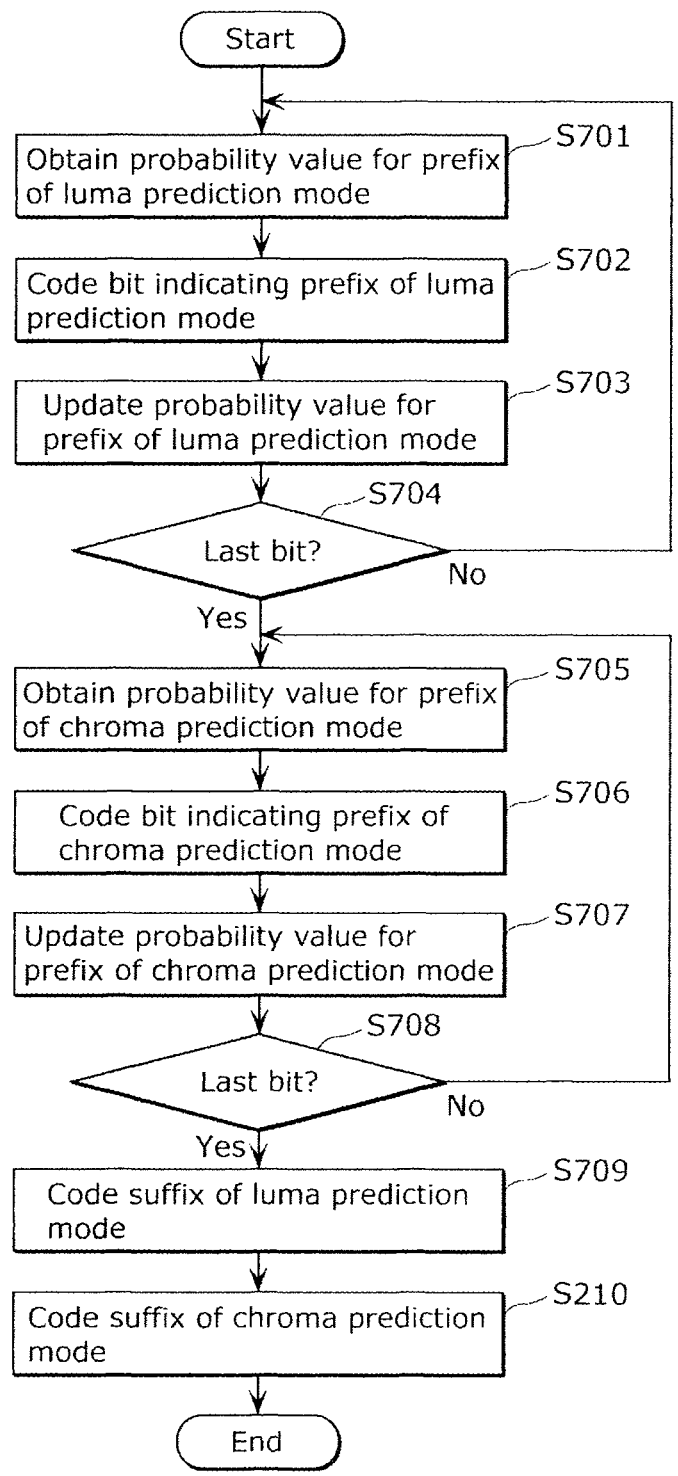
FIG. 15 is a flowchart illustrating coding processing by an intra prediction mode according to Embodiment 2.

FIG. 15 is a flowchart illustrating processing performed by an intra prediction mode coder according to Embodiment 2. First, the intra prediction mode coder obtains a luma prediction mode, and obtains a probability value for the prefix of binary data indicating the luma prediction mode (S701). It should be noted that this probability value is determined based on a context index, as with the probability value described in Embodiment 1.

Next, the intra prediction mode coder codes a bit indicating the prefix of the luma prediction mode by arithmetic coding, with reference to the probability value (S702). Next, the intra prediction mode coder updates the probability value for the prefix of the luma prediction mode (S703). It should be noted that the method described in NPL 1 or 2 may be used as the arithmetic coding method and the probability updating method. An effect is obtained by any method of coding a code (symbol) based on the probability of a code (symbol).

If the coded bit is not the last bit, or in other words, if the coded bit is not the last bin (No in S704), the intra prediction mode coder processes the next bit.

If the coded bit is the last bit (Yes in S704), the intra prediction mode coder obtains the probability value for the prefix of a chroma prediction mode (S705). Then, the intra prediction mode coder codes a bit indicating the prefix of the chroma prediction mode by arithmetic coding (S706). Then, the intra prediction mode coder updates the probability value for the prefix of the chroma prediction mode (S707).

If the coded bit is not the last bit (No in S708), the intra prediction mode coder processes the next bit.

If the coded bit is the last bit (Yes in S708), the intra prediction mode coder executes bypass coding on the suffix of the luma prediction mode (S709), and bypass coding on the suffix of the chroma prediction mode (S710).

Bypass coding described in NPL 1 or 2 may be used for this bypass coding. It should be noted that bypass coding is coding in which a probability is not updated. Bypass coding according to the present embodiment may be a method different from bypass coding described in NPL 1 or 2. Even in such a case, the effect is not deteriorated.

It should be noted that coding can also be performed in parallel, as in (a) to (d) of FIG. 9 described in Embodiment 1. Therefore, the speed of coding processing can be increased.

In addition, as the coding method corresponding to the variation of Embodiment 1, the intra prediction mode coder may generate a binary string indicating JOINT_IDX illustrated in FIG. 12, and process a prefix and a suffix of a binary string, sequentially. In this case, the intra prediction mode coder codes the prefix by context adaptive binary arithmetic coding. Accordingly, coding efficiency increases, and the speed of coding processing increases.

Figure 16:
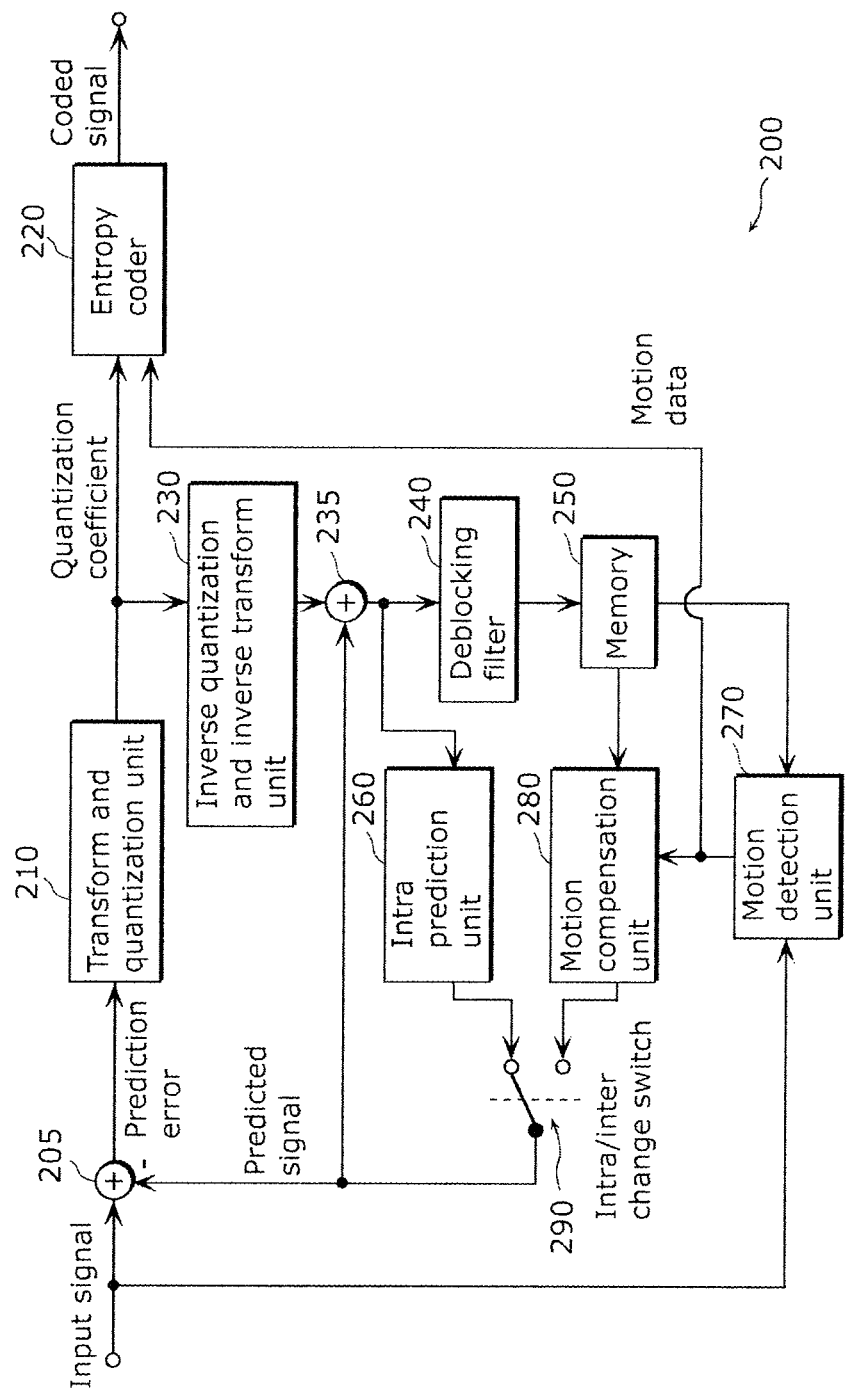
FIG. 16 is a block diagram illustrating an example of a configuration of an image coding apparatus according to Embodiment 2.

FIG. 16 is a block diagram illustrating the configuration of an image coding apparatus according to the present embodiment. An image coding apparatus 200 illustrated in FIG. 16 includes a subtractor 205, a transform and quantization unit 210, an entropy coder 220, an inverse quantization and inverse transform unit 230, an adder 235, a deblocking filter 240, a memory 250, an intra prediction unit 260, a motion detection unit 270, a motion compensation unit 280, and an intra/inter change switch 290.

The subtractor 205 calculates a difference between an input signal and a predicted signal, or in other words, a prediction error. The transform and quantization unit 210 transforms a prediction error in a spatial domain to generate a transform coefficient in a frequency domain. For example, the transform and quantization unit 210 performs discrete cosine transform (DCT) on the prediction error, to generate a transform coefficient. Furthermore, the transform and quantization unit 210 quantizes the transform coefficient, to generate a quantization coefficient.

The entropy coder 220 performs variable length coding on the quantization coefficient, to generate a coded signal. Further, the entropy coder 220 codes motion data (for example, motion vector) detected by the motion detection unit 270, and outputs the data included in the coded signal.

The inverse quantization and inverse transform unit 230 performs inverse quantization on the quantization coefficient, to reconstruct a transform coefficient. Furthermore, the inverse quantization and inverse transform unit 230 performs inverse transform on the reconstructed transform coefficient, to reconstruct the prediction error. It should be noted that the reconstructed prediction error has information loss due to quantization, and thus does not match the prediction error generated by the subtractor 205. Specifically, the reconstructed prediction error includes a quantization error.

The adder 235 adds the reconstructed prediction error to the predicted signal, to generate a local decoded image. The deblocking filter 240 performs deblocking filter processing on the generated local decoded image.

The memory 250 is a memory for storing reference images used for motion compensation. Specifically, the memory 250 stores the locally decoded image on which deblocking filter processing has been performed.

The intra prediction unit 260 performs intra prediction in accordance with an intra prediction mode, to generate a predicted signal (intra prediction signal). Specifically, the intra prediction unit 260 performs intra prediction by referring to an image around a current block to be coded (input signal) in the locally decoded image generated by the adder 235, to generate an intra-predicted signal.

The motion detection unit 270 detects motion data (for example, motion vector) between an input signal and a reference image stored in the memory 250. The motion compensation unit 280 performs motion compensation, based on the detected motion data, to generate a predicted signal (inter-predicted signal).

The intra/inter change switch 290 selects either one of an intra-predicted signal and an inter-predicted signal, and outputs the selected signal as a predicted signal to the subtractor 205 and the adder 235.

Using the above configuration, the image coding apparatus 200 according to Embodiment 2 codes image data. It should be noted that the image coding apparatus 200 includes the intra prediction mode coder according to Embodiment 2 in the entropy coder 220, for example.

Embodiment 3

The present embodiment describes distinctive configurations and procedures included in Embodiment 1, the variation of Embodiment 1, or Embodiment 2 for confirmation. A configuration and a procedure according to the present embodiment correspond to the configuration and the procedure described in Embodiment 1, the variation of Embodiment 1, or Embodiment 2. Specifically, the concept described in Embodiment 1, the variation of Embodiment 1, or Embodiment 2 includes the configuration and the procedure according to the present embodiment.

Figure 17:
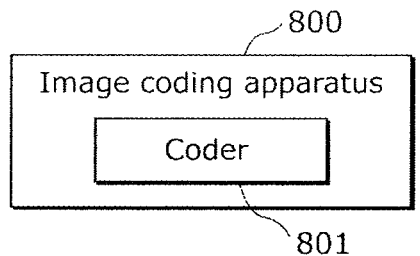
FIG. 17 is a block diagram illustrating an example of a configuration of an image coding apparatus according to Embodiment 3.

FIG. 17 is a block diagram illustrating an example of a configuration of an image coding apparatus 200 according to Embodiment 3. An image coding apparatus 800 illustrated in FIG. 17 codes an image using plural intra prediction modes. The image coding apparatus 800 includes a coder 801.

Figure 18:
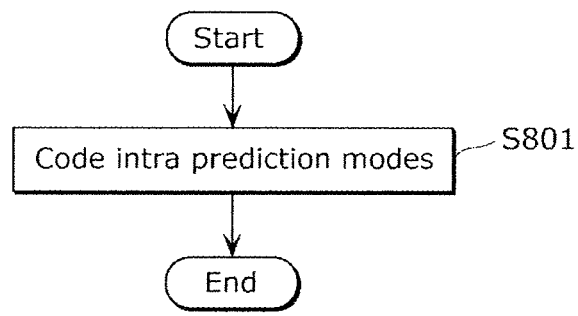
FIG. 18 is a flowchart illustrating processing by the image coding apparatus according to Embodiment 3.

FIG. 18 is a flowchart illustrating processing performed by the image coding apparatus 800 illustrated in FIG. 17. The coder 801 codes first binary data that indicates a first intra prediction mode used for coding an image and second binary data that indicates a second intra prediction mode used for coding the image (S801).

At this time, the coder 801 codes a first context adaptive portion and a second context adaptive portion by context adaptive binary arithmetic coding. The coder 801 codes a first bypass portion and a second bypass portion by bypass coding. Then, the coder 801 generates coded data which includes the first context adaptive portion, the second context adaptive portion, the first bypass portion, and the second bypass portion.

Context adaptive binary arithmetic coding is arithmetic coding in which a variable probability updated based on coded data is used. Bypass coding is arithmetic coding in which a predetermined fixed probability is used. The first context adaptive portion is part of the first binary data. The second context adaptive portion is part of the second binary data. The first bypass portion is different part of the first binary data. The second bypass portion is different part of the second binary data.

Coded data includes the first bypass portion and the second bypass portion subsequent to the first context adaptive portion and the second context adaptive portion.

Accordingly, the coded data is generated in which plural portions for which bypass decoding is use are contiguous. Therefore, the degree of parallelism of decoding processing may increase. Thus, intra prediction modes are efficiently coded.

In the above configuration, for example, the first intra prediction mode may be an intra prediction mode used to predict the luma of the image. Furthermore, the second intra prediction mode may be an intra prediction mode used to predict the chroma of the image.

In addition, for example, coded data may include the first context adaptive portion, the second context adaptive portion, the second bypass portion, and the first bypass portion, in the order: the first context adaptive portion; the second context adaptive portion; the second bypass portion; and the first bypass portion.

In addition, for example, if the second binary data does not include the second bypass portion, the coder 801 may code a whole of the second binary data as the second context adaptive portion, by context adaptive binary arithmetic coding. Then, the coder 801 may generate coded data which does not include the second bypass portion.

In addition, for example, the first intra prediction mode may be an intra prediction mode used to predict the luma of a first block included in the image. The second intra prediction mode may be an intra prediction mode used to predict the luma of a second block included in the image.

In addition, for example, the coder 801 may code the first binary data, the second binary data, third binary data, fourth binary data, and fifth binary data that indicate the first intra prediction mode, the second intra prediction mode, a third intra prediction mode, a fourth intra prediction mode, and a fifth intra prediction mode, respectively. The second intra prediction mode may be an intra prediction mode used to predict the chroma of a block included in the image. The first, third, fourth, and fifth intra prediction modes may be four intra prediction modes used to predict the luma of four sub-blocks which constitute the block.

Then, the coder 801 may code the first and second context adaptive portions, and third, fourth and fifth context adaptive portions by context adaptive binary arithmetic coding. The coder 801 may code the first and second bypass portions, and third, fourth and fifth bypass portions by bypass coding.

The first, second, third, fourth, and fifth context adaptive portions are part of the first, second, third, fourth, and fifth binary data, respectively. The first, second, third, fourth, and fifth bypass portions are part of the first, second, third, fourth, and fifth binary data, respectively.

In this case, coded data to be generated may include the first context adaptive portion, the third context adaptive portion, the fourth context adaptive portion, the fifth context adaptive portion, the second context adaptive portion, the second bypass portion, the first bypass portion, the third bypass portion, the fourth bypass portion, and the fifth bypass portion, in the order: the first context adaptive portion; the third context adaptive portion; the fourth context adaptive portion; the fifth context adaptive portion; the second context adaptive portion; the second bypass portion; the first bypass portion; the third bypass portion; the fourth bypass portion; and the fifth bypass portion.

In addition, for example, the coder 801 may code the first bypass portion and the second bypass portion in parallel.

In addition, for example, the coder 801 may switch to one of first coding processing conforming to a first standard and second coding processing conforming to a second standard. Then, the coder 801 may generate a bitstream which includes identification information indicating the first standard or the second standard to which the one of the first coding processing and the second coding processing conforms.

Then, if the switch is made to the first coding processing, the coder 801 may generate coded data which includes the first bypass portion and the second bypass portion subsequent to the first context adaptive portion and the second context adaptive portion. In this case, the coder 801 may generate a bitstream which includes identification information and coded data.

Figure 19:
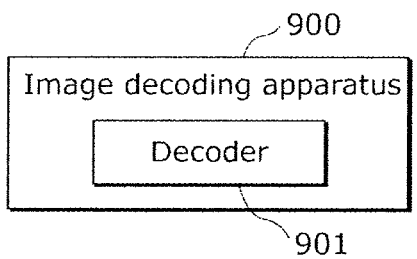
FIG. 19 is a block diagram illustrating an example of a configuration of an image decoding apparatus according to Embodiment 3.

FIG. 19 is a block diagram illustrating an example of a configuration of an image decoding apparatus according to Embodiment 3. An image decoding apparatus 900 illustrated in FIG. 19 decodes an image using plural intra prediction modes. Further, the image decoding apparatus 900 includes a decoder 901.

Figure 20:
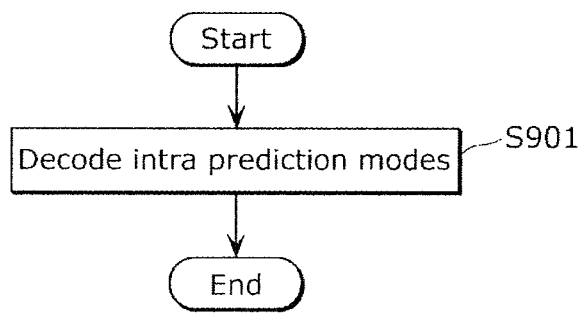
FIG. 20 is a flowchart illustrating processing by the image decoding apparatus according to Embodiment 3.

FIG. 20 is a flowchart illustrating processing by the image decoding apparatus 900 illustrated in FIG. 19. The decoder 901 decodes first binary data which indicates a first intra prediction mode used to decode an image, and second binary data which indicates a second intra prediction mode used to decode the image (S901).

At this time, the decoder 901 obtains coded data which includes a first context adaptive portion, a second context adaptive portion, a first bypass portion, and a second bypass portion. Then, the decoder 901 decodes the first context adaptive portion and the second context adaptive portion by context adaptive binary arithmetic decoding. Also, the decoder 901 decodes the first bypass portion and the second bypass portion by bypass decoding.

Context adaptive binary arithmetic decoding is arithmetic decoding in which a variable probability updated based on decoded data is used. Bypass decoding is arithmetic decoding in which a predetermined fixed probability is used. The first context adaptive portion is part of the first binary data. The second context adaptive portion is part of the second binary data. The first bypass portion is different part of the first binary data. The second bypass portion is different part of the second binary data.

Coded data includes the first bypass portion and the second bypass portion subsequent to the first context adaptive portion and the second context adaptive portion.

Accordingly, coded data is obtained in which plural portions for which bypass decoding is used are contiguous. Therefore, the degree of parallelism of decoding processing may increase. Accordingly, intra prediction modes are decoded efficiently.

In the above configuration, for example, the first intra prediction mode may be an intra prediction mode used to predict the luma of an image. Furthermore, the second intra prediction mode may be an intra prediction mode used to predict the chroma of an image.

Coded data may include the first context adaptive portion, the second context adaptive portion, the second bypass portion, and the first bypass portion, in the order: the first context adaptive portion; the second context adaptive portion; the second bypass portion; and the first bypass portion, for example.

If the obtained coded data does not include the second bypass portion, the decoder 901 may decode a whole of the second binary data by decoding the second context adaptive portion using context adaptive binary arithmetic decoding, for example.

In addition, for example, the first intra prediction mode may be an intra prediction mode used to predict the luma of a first block included in the image. The second intra prediction mode may be an intra prediction mode used to predict the luma of a second block included in the image.

In addition, for example, the decoder 901 may decode the first binary data, the second binary data, third binary data, fourth binary data, and fifth binary data that indicate the first intra prediction mode, the second intra prediction mode, a third intra prediction mode, a fourth intra prediction mode, and a fifth intra prediction mode, respectively. The second intra prediction mode may be an intra prediction mode used to predict the chroma of a block included in the image. The first, third, fourth, and fifth intra prediction modes may be four intra prediction modes used to predict the luma of four sub-blocks which constitute the block.

Then, the decoder 901 may decode the first and second context adaptive portions, and third, fourth and fifth context adaptive portions by context adaptive binary arithmetic decoding. In addition, the decoder 901 may decode the first and second bypass portions, and third, fourth and fifth bypass portions by bypass decoding.

The first, second, third, fourth, and fifth context adaptive portions are part of the first, second, third, fourth, and fifth binary data, respectively. The first, second, third, fourth, and fifth bypass portions are different part of first, second, third, fourth, and fifth binary data, respectively.

In this case, obtained coded data may include the first context adaptive portion, the third context adaptive portion, the fourth context adaptive portion, the fifth context adaptive portion, the second context adaptive portion, the second bypass portion, the first bypass portion, the third bypass portion, the fourth bypass portion, and the fifth bypass portion, in the order: the first context adaptive portion; the third context adaptive portion; the fourth context adaptive portion; the fifth context adaptive portion; the second context adaptive portion; the second bypass portion; the first bypass portion; the third bypass portion; the fourth bypass portion; and the fifth bypass portion.

For example, the decoder 901 may decode the first bypass portion and the second bypass portion in parallel.

Further, for example, the decoder 901 may obtain a bitstream which includes identification information indicating a first standard or a second standard. Then, based on the identification information, the decoder 901 may switch to one of first decoding processing conforming to the first standard and second decoding processing conforming to the second standard.

Then, if the switch is made to the first decoding processing, the decoder 901 may obtain, from a bitstream, a code string which includes the first bypass portion and the second bypass portion subsequent to the first context adaptive portion and the second context adaptive portion.

For example, an image coding and decoding apparatus may include the image coding apparatus 800 and the image decoding apparatus 900.

The image coding apparatus 800 and the image decoding apparatus 900 according to the present embodiment are also applicable to the example described below.

FIG. 21 illustrates an example of syntax according to Embodiment 3. "prev_intra_luma_pred_flag", "mpm_idx", and "rem_intra_luma_pred_mode" illustrated in FIG. 21 are elements indicating a luma prediction mode. "intra_chroma_pred_mode" is an element indicating a chroma prediction mode.

Context adaptive binary arithmetic coding is used for "prev_intra_luma_pred_flag". Bypass coding is used for "mpm_idx" and "rem_intra_luma_pred_mode". Context adaptive binary arithmetic coding and bypass coding are used for "intra_chroma_pred_mode".

It should be noted that the decoding apparatus uses context adaptive binary arithmetic decoding for a context adaptive portion for which the coding apparatus uses context adaptive binary arithmetic coding. Similarly, the decoding apparatus uses bypass decoding for a bypass portion for which the coding apparatus uses bypass coding.

Figures 22, 23, 24:
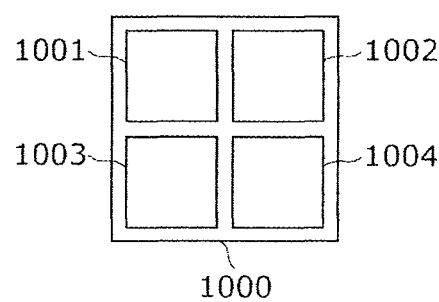
FIG. 22 illustrates arithmetic coding on luma according to Embodiment 3.
FIG. 23 illustrates arithmetic coding on chroma according to Embodiment 3.
FIG. 24 illustrates blocks of an image according to Embodiment 3.

FIG. 22 illustrates arithmetic coding on luma according to Embodiment 3. Either "mpm_idx" or "rem_intra_luma_pred_mode" is used to determine a luma prediction mode. Which of "mpm_idx" and "rem_intra_luma_pred_mode" is to be used is identified by "prev_intra_luma_pred_flag". "mpm_idx" and "rem_intra_luma_pred_mode" correspond to numbers for identifying luma prediction modes and binary values thereof.

FIG. 23 illustrates arithmetic coding on chroma according to Embodiment 3. "intra_chroma_pred_mode" is used to determine a chroma prediction mode. "intra_chroma_pred_mode" corresponds to a number for identifying a chroma prediction mode and a binary value thereof. Context adaptive binary arithmetic coding is used for the first bit indicating the binary value. Bypass coding is used for the second and subsequent bits indicating the binary value. Bypass coding is not used if the second and subsequent bits are not present.

FIG. 24 illustrates blocks of an image according to Embodiment 3. Examples of blocks of an image include data area units referred to as coding units (CU), prediction units (PU), and transform units (TU). A coding unit includes 64×64 pixels, 32×32 pixels, 16×16 pixels, or 8×8 pixels. The size of the smallest coding unit is 8×8 pixels, currently. Thus, log 2MinCUsize which indicates the size of the smallest coding unit is 3.

In the case of intra prediction, the size of a prediction unit is the same as the size of a coding unit, basically. Dividing a coding unit larger than a unit having the smallest size (8×8 pixels) into four prediction units is not allowed. Dividing a coding unit having the smallest size into four prediction units is allowed. Accordingly, four prediction units may be included in an 8×8-pixel coding unit.

The type of prediction unit (PU_TYPE) which has the same size as the size of a coding unit is called 2N×2N. The type of prediction unit obtained by a unit being divided into four is called N×N.

FIG. 24 illustrates an example in which a coding unit 1000 includes prediction units 1001, 1002, 1003, and 1004. In this case, chroma intra prediction is executed on the coding unit 1000. Then, luma intra prediction is executed on each of the prediction units 1001, 1002, 1003, and 1004. Therefore, one chroma prediction mode and four luma prediction modes are used for the coding unit 1000.

FIG. 25 illustrates a first variation of syntax according to Embodiment 3. In the case of FIG. 24, the syntax illustrated in FIG. 21 is changed, as illustrated in FIG. 25. In the case of FIG. 25, context adaptive binary arithmetic coding and bypass coding are executed alternately. Therefore, it is difficult to increase the degree of parallelism.

Figure 26:
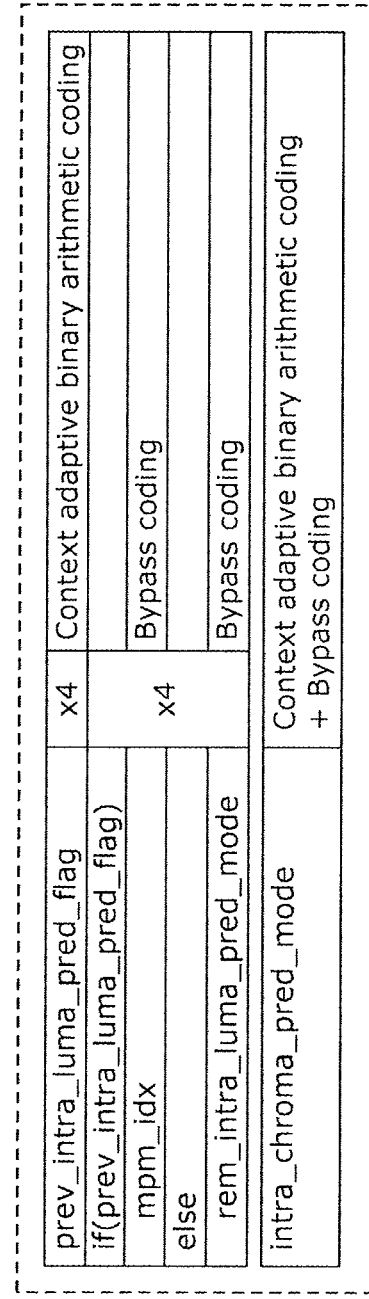
FIG. 26 illustrates a second variation of syntax according to Embodiment 3.

FIG. 26 illustrates a second variation of syntax according to Embodiment 3. The syntax illustrated in FIG. 25 is changed as illustrated in FIG. 26, in order to increase the degree of parallelism. In FIG. 26, prev_intra_luma_pred_flag is repeated 4 times, and subsequent thereto mpm_idx or rem_intra_pred_mode is repeated 4 times.

Thus, plural context adaptive portions on which context adaptive binary arithmetic coding is executed and plural bypass portions on which bypass coding is executed are separated, and put together. Consequently, the degree of parallelism increases.

Figure 27:
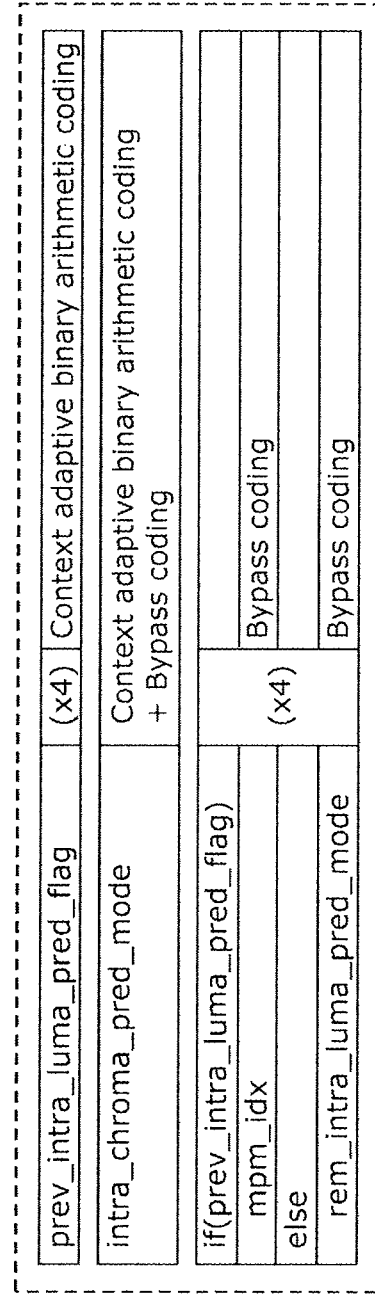
FIG. 27 illustrates a third variation of syntax according to Embodiment 3.

FIG. 27 illustrates a third variation of syntax according to Embodiment 3. In FIG. 27, intra_chroma_pred_mode is disposed subsequent to prev_intra_luma_pred_flag. Accordingly, with regard to luma prediction modes and a chroma prediction mode as a whole, plural context adaptive portions on which context adaptive binary arithmetic coding is executed and plural bypass portions on which bypass coding is executed are separated and put together. Therefore, the degree of parallelism is enhanced.

In addition, the context adaptive portion of intra_chroma_pred_mode and the bypass portion of intra_chroma_pred_mode are contiguous, thereby preventing an increase in the degree of complexity.

It should be noted that in FIG. 27, prev_intra_luma_pred_flag may be repeated 4 times or may not be repeated 4 times. Similarly, mpm_idx or rem_intra_pred_mode may be repeated 4 times or may not be repeated 4 times. Thus, the example illustrated in FIG. 27 is applicable to both of the case where a coding unit is divided into four prediction units and the case where a coding unit is not divided into four prediction units. In either case, the degree of parallelism is enhanced since plural bypass portions are pout together.

In addition, if a coding unit is divided into four prediction units, the elements illustrated in FIGS. 25, 26, and 27 may be included in coded data, as elements of the upper left prediction unit 1001.

In the image coding method and the image decoding method described in the above embodiments, the degree of parallelism is enhanced by combining plural intra prediction modes. Therefore, an image is coded efficiently and decoded efficiently.

It should be noted that in the above embodiments, each of the constituent elements may be constituted by dedicated hardware, or may be obtained by executing a software program suitable for the constituent element. Each constituent element may be obtained by a program execution unit such as a CPU or a processor reading and executing a software program recorded on a recording medium such as a hard disk or semiconductor memory. Here, the software which achieves the image coding apparatus, the image decoding method, and others according to the above embodiments is a program as described below.

Specifically, this program causes a computer to execute an image coding method for coding an image using plural intra prediction modes, the image coding method including coding first binary data and second binary data, the first binary data indicating a first intra prediction mode used to code the image, the second binary data indicating a second intra prediction mode used to code the image, wherein in the coding, a first context adaptive portion and a second context adaptive portion are coded by context adaptive binary arithmetic coding, the first context adaptive portion being part of the first binary data, the second context adaptive portion being part of the second binary data, the context adaptive binary arithmetic coding being arithmetic coding using a variable probability updated based on coded data, a first bypass portion and a second bypass portion are coded by bypass coding, the first bypass portion being different part of the first binary data, the second bypass portion being different part of the second binary data, the bypass coding being arithmetic coding using a predetermined fixed probability, and coded data is generated which includes the first context adaptive portion, the second context adaptive portion, the first bypass portion, and the second bypass portion, the first bypass portion and the second bypass portion being included subsequent to the first context adaptive portion and the second context adaptive portion.

In addition, this program causes a computer to execute an image decoding method for decoding an image using plural intra prediction modes, the image decoding method including decoding first binary data and second binary data, the first binary data indicating a first intra prediction mode to be used to decode the image, the second binary data indicating a second intra prediction mode to be used to decode the image, wherein in the decoding, coded data is obtained which includes a first context adaptive portion, a second context adaptive portion, a first bypass portion, and a second bypass portion, the first context adaptive portion being part of the first binary data, the second context adaptive portion being part of the second binary data, the first bypass portion being different part of the first binary data, the second bypass portion being different part of the second binary data, the first bypass portion and the second bypass portion being included subsequent to the first context adaptive portion and the second context adaptive portion, the first context adaptive portion and the second context adaptive portion are decoded by context adaptive binary arithmetic decoding which is arithmetic decoding using a variable probability updated based on decoded data, and the first bypass portion and the second bypass portion are decoded by bypass decoding which is arithmetic decoding using a predetermined fixed probability.

Although the above is a description of the image coding method and the image decoding method according to one or more aspects of the present invention, based on the embodiments, the present invention is not limited to the above embodiments. Various modifications to the embodiments that may be conceived by those skilled in the art and combinations of constituent elements in different embodiments may be included within the scope of one or more aspects of the present invention, without departing from the spirit of the present invention.

Embodiment 4

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 28:
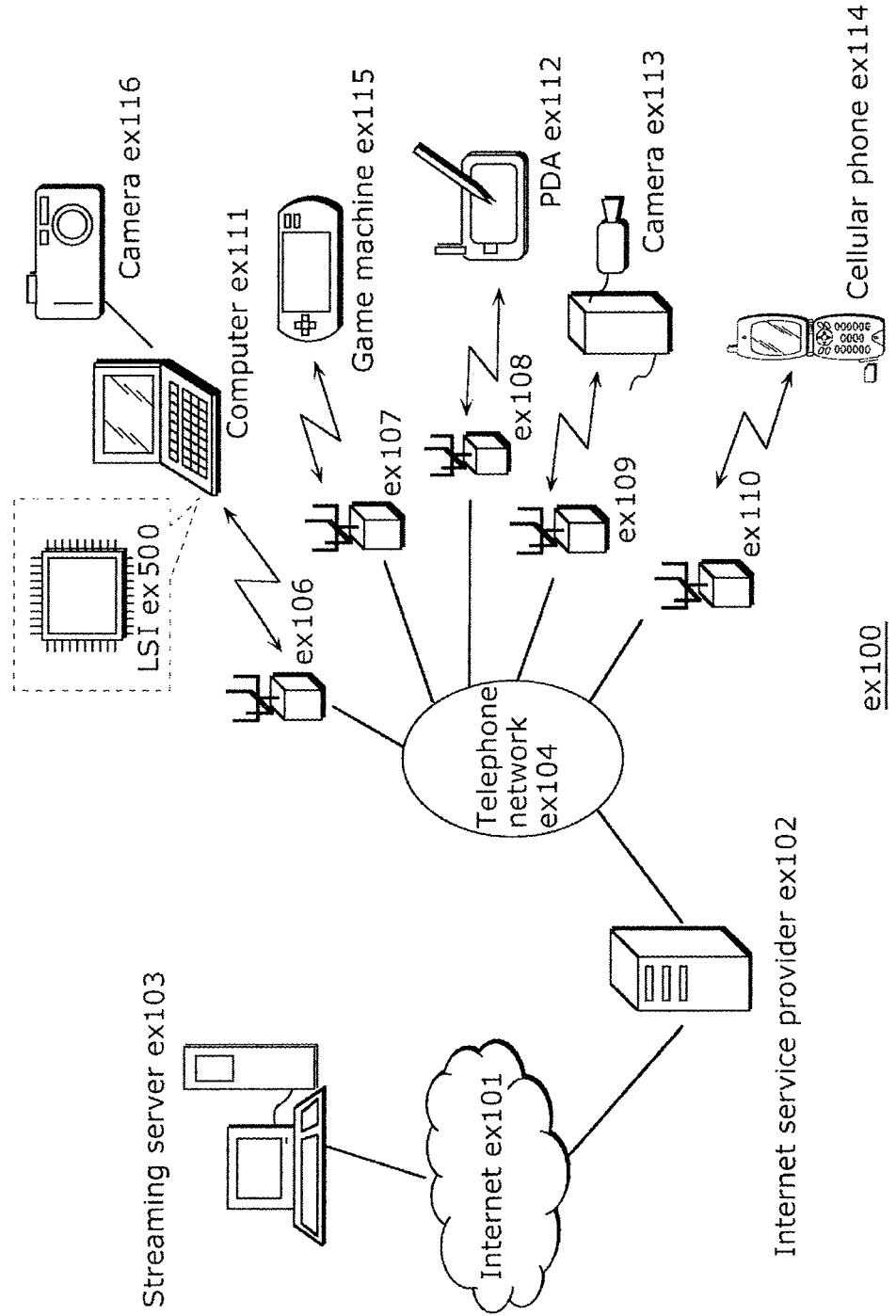
FIG. 28 illustrates an overall configuration of a content providing system for implementing content distribution services.

FIG. 28 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 28, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 29:
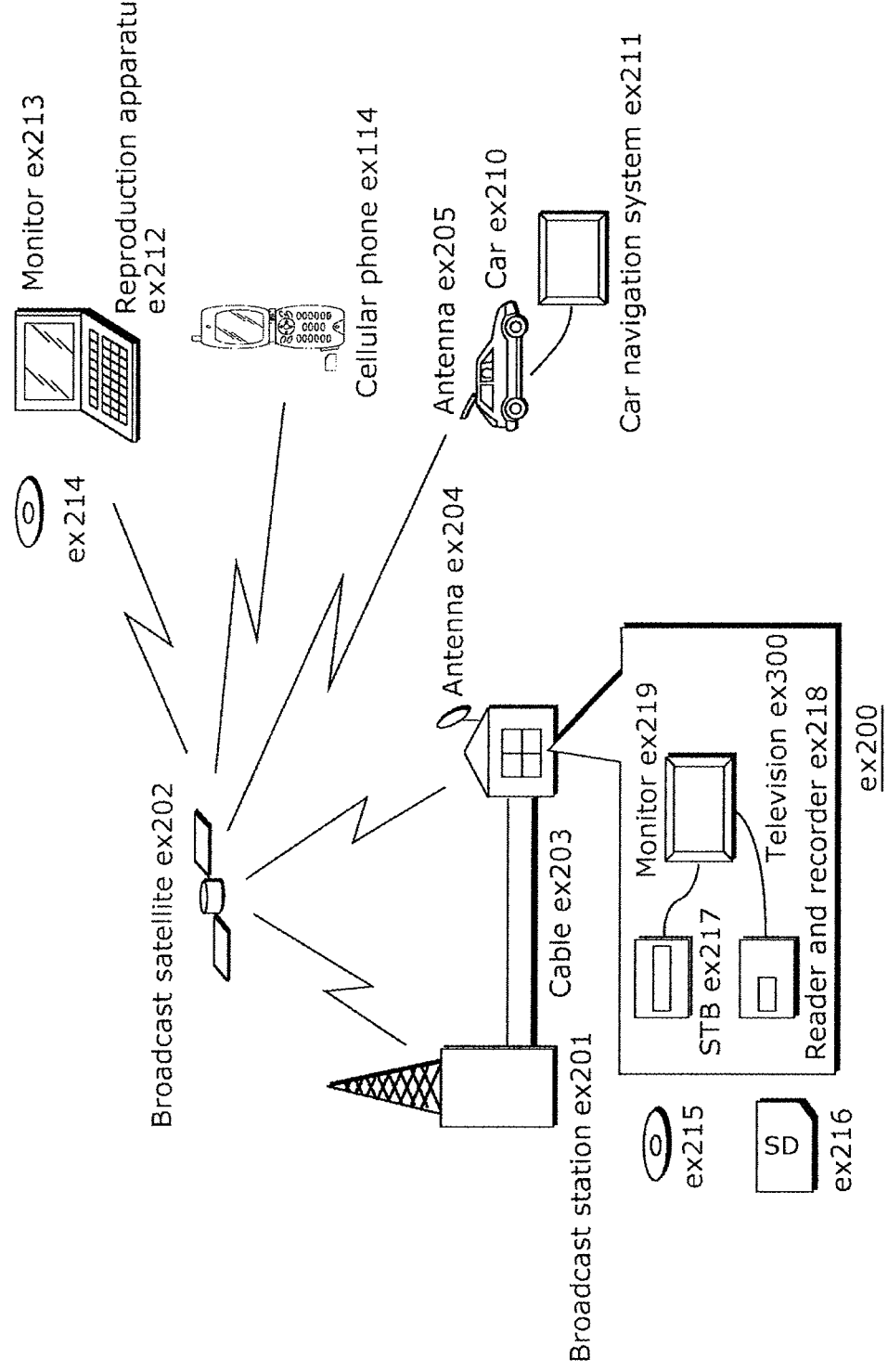
FIG. 29 illustrates an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 29. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 30:
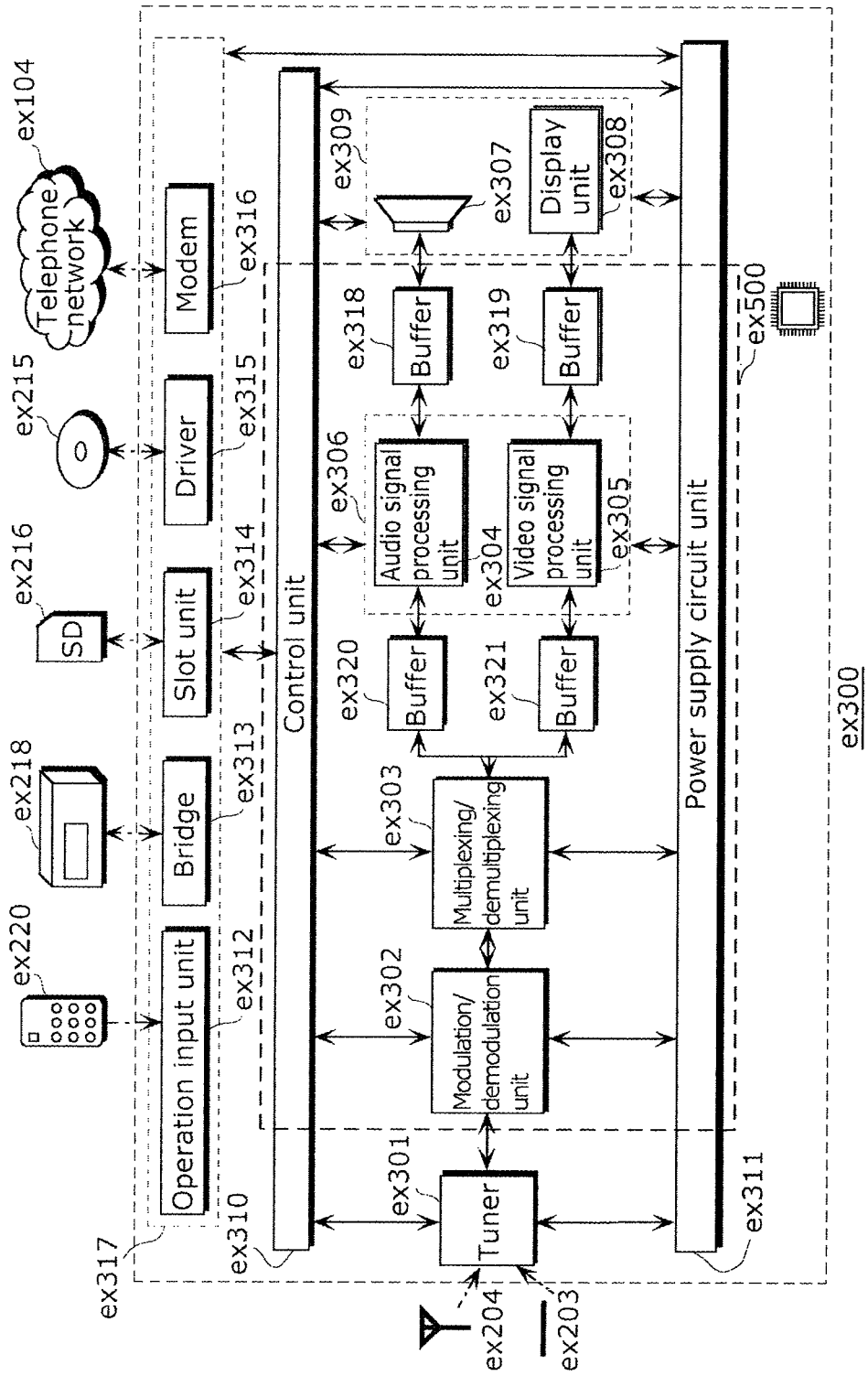
FIG. 30 is a block diagram illustrating an example of a configuration of a television.

FIG. 30 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 31:
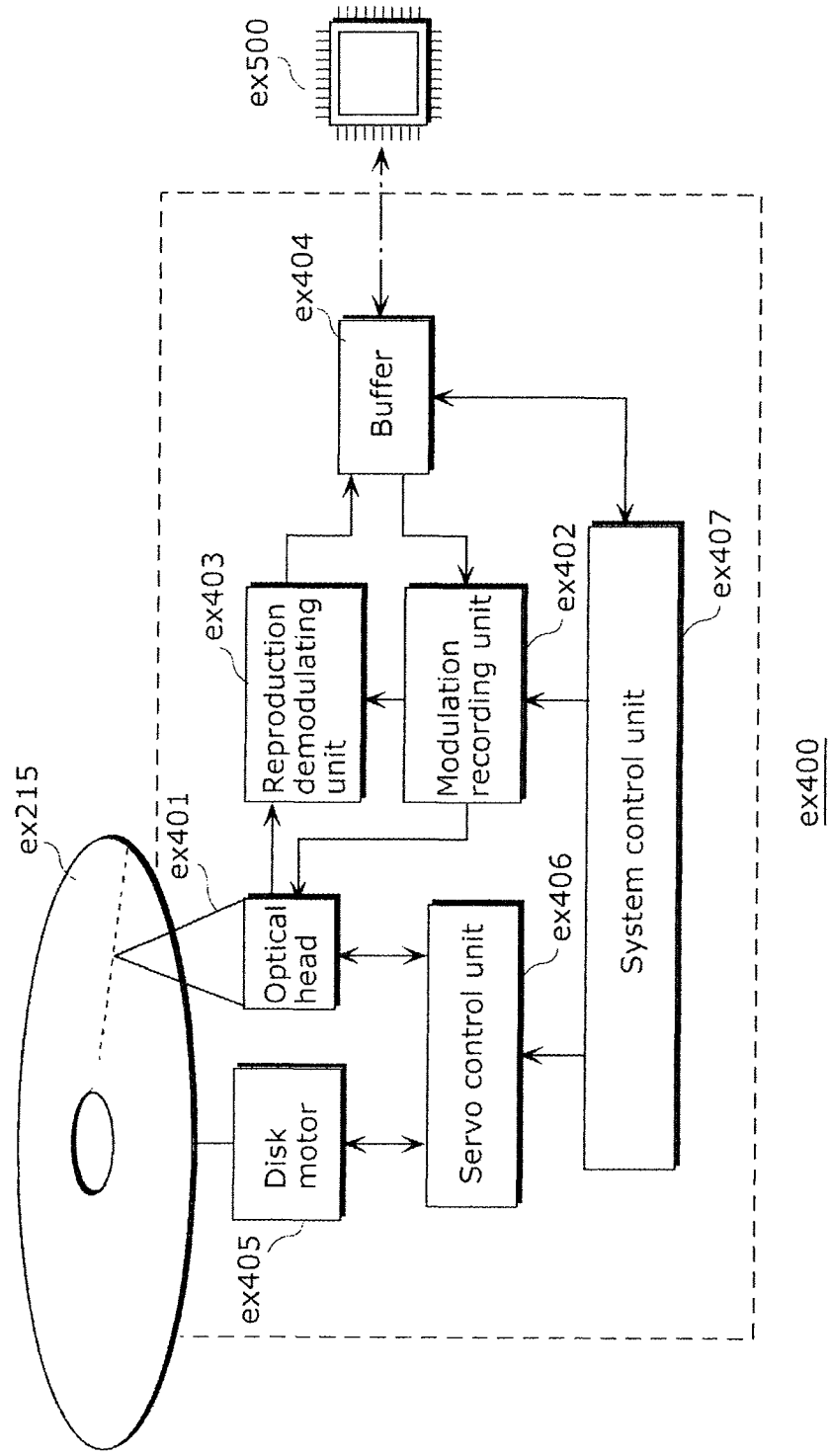
FIG. 31 is a block diagram illustrating an example of a configuration of an information reproducing/recording unit that reads and writes information from and on a recording medium that is an optical disk.

As an example, FIG. 31 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 32:
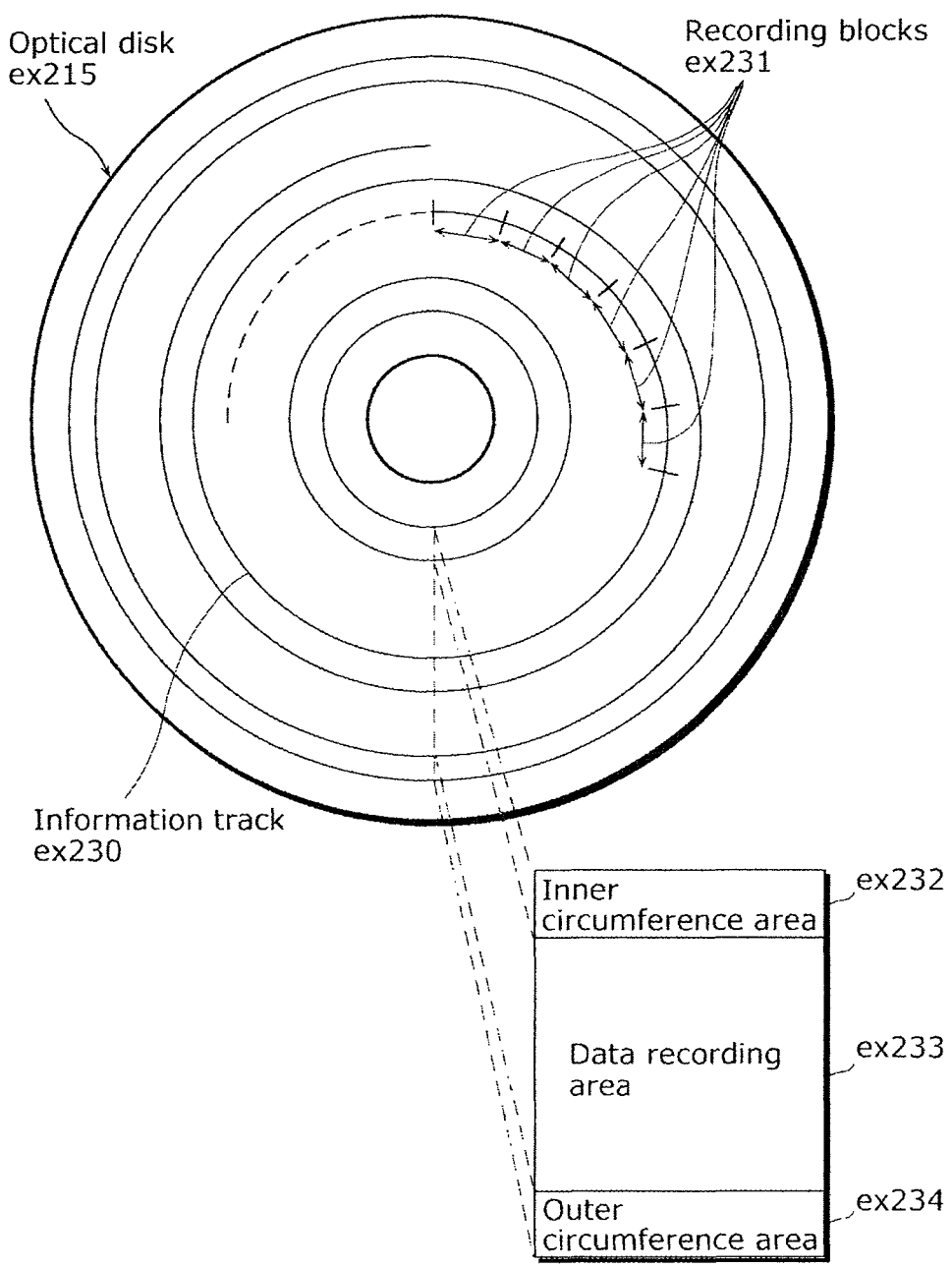
FIG. 32 illustrates an example of a configuration of a recording medium that is an optical disk.

FIG. 32 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 30. The same will be true for the configuration of the computer ex111, the cellular phone ex114, and others.

Figure 33A:
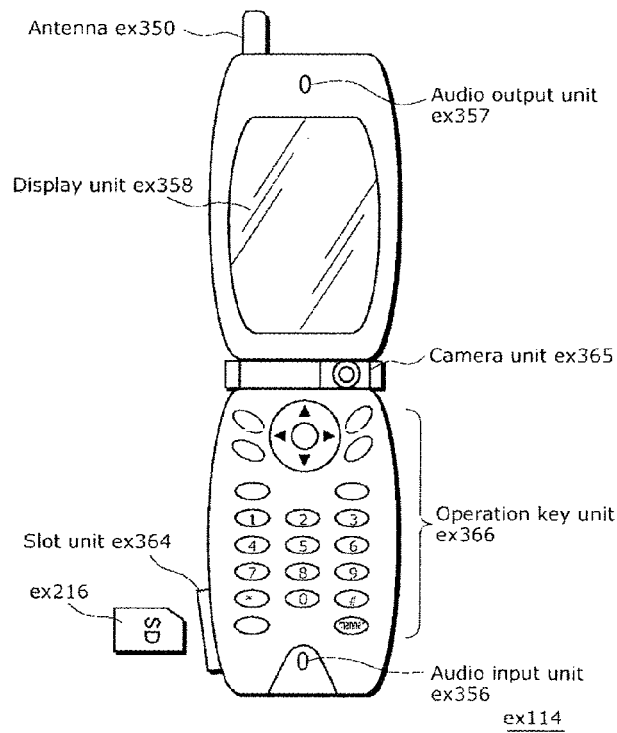
FIG. 33A illustrates an example of a cellular phone.

FIG. 33A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 33B:
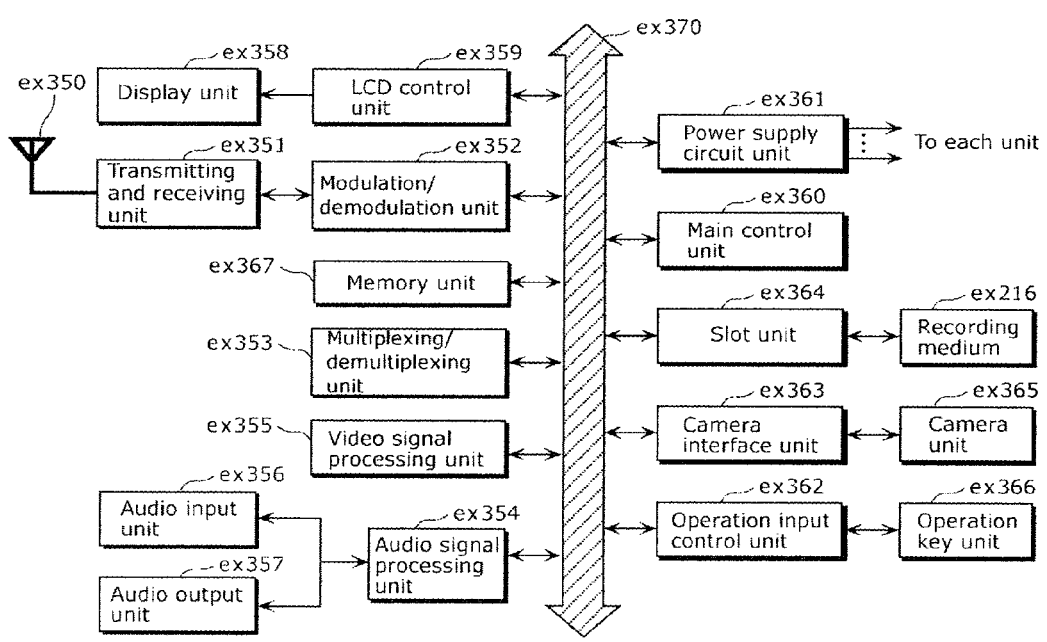
FIG. 33B is a block diagram showing an example of a configuration of a cellular phone.

Next, an example of a configuration of the cellular phone ex114 will be described with reference to FIG. 33B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 34 illustrates a structure of the multiplexed data. As illustrated in FIG. 34, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 35:
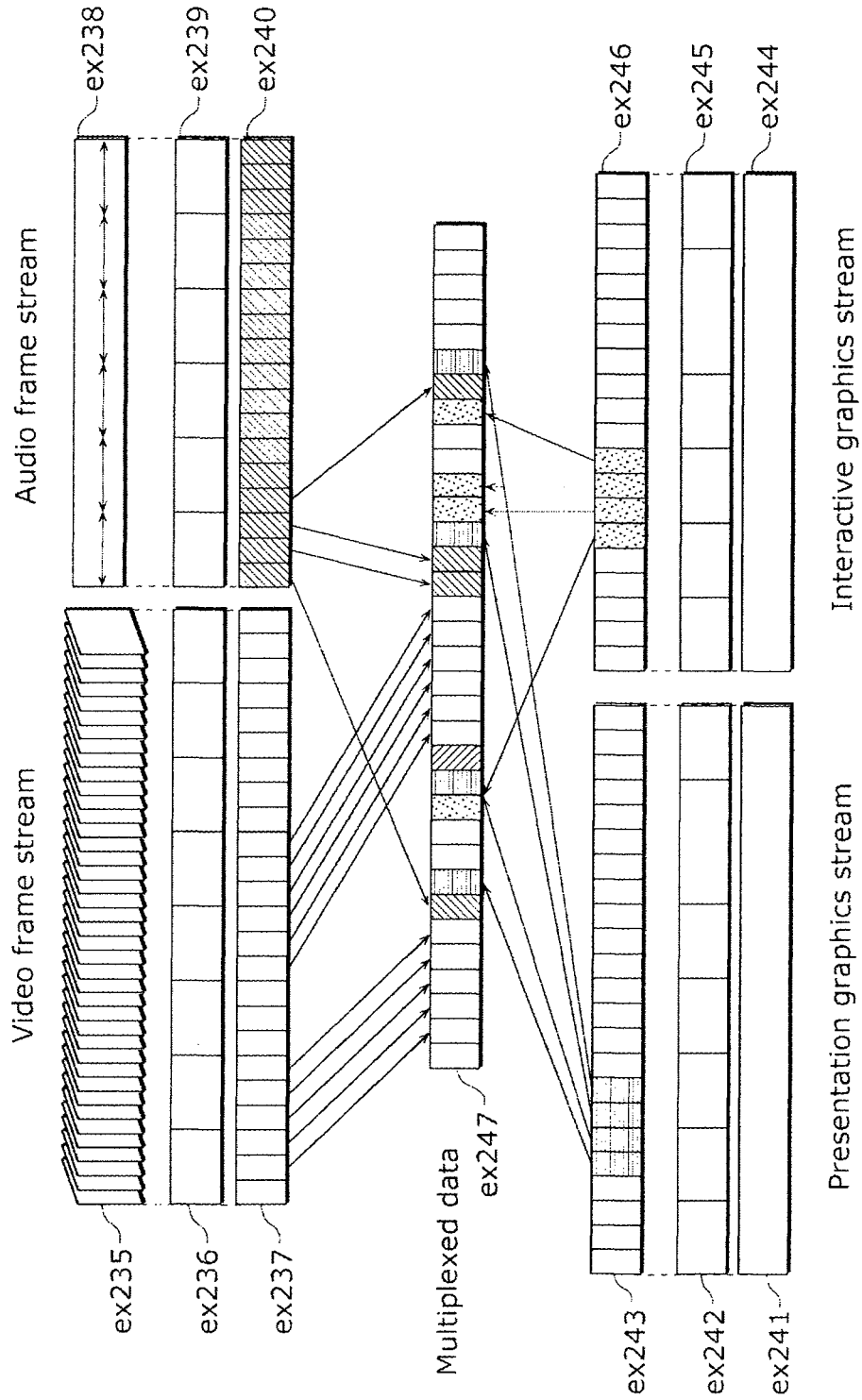
FIG. 35 schematically illustrates how each stream is multiplexed in multiplexed data.

FIG. 35 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 36:
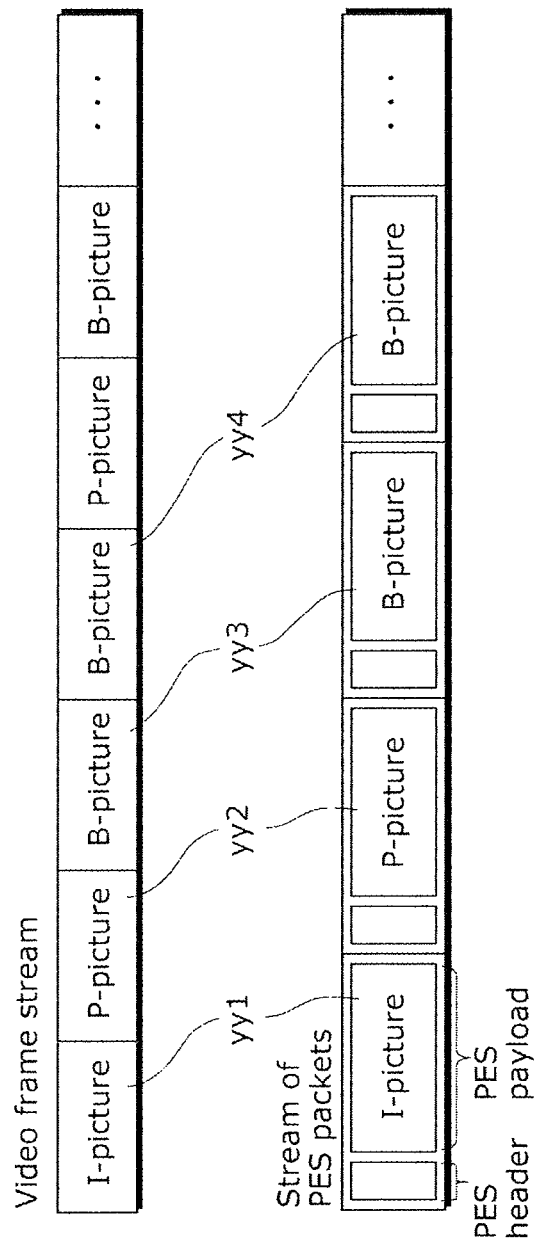
FIG. 36 illustrates how a video stream is stored in a stream of PES packets in more detail.

FIG. 36 illustrates how a video stream is stored in a stream of PES packets in more detail. The first bar in FIG. 36 shows a video frame stream in a video stream. The second bar shows the stream of PES packets. As indicated by arrows denoted as yy1, yy2, yy3, and yy4 in FIG. 36, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 37:
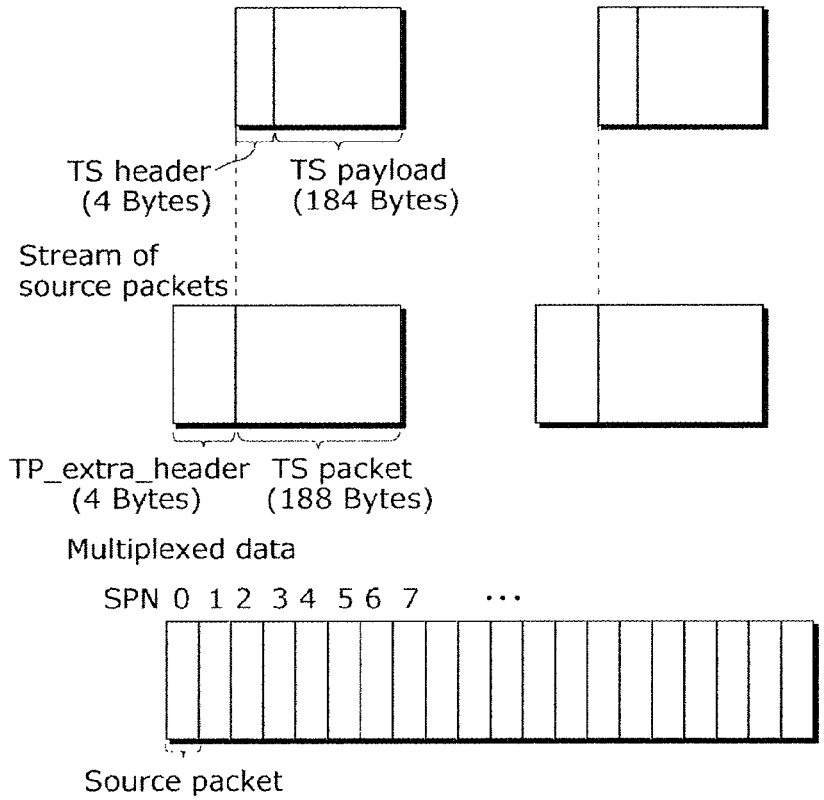
FIG. 37 illustrates a structure of TS packets and source packets in the multiplexed data.

FIG. 37 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 37. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 38:
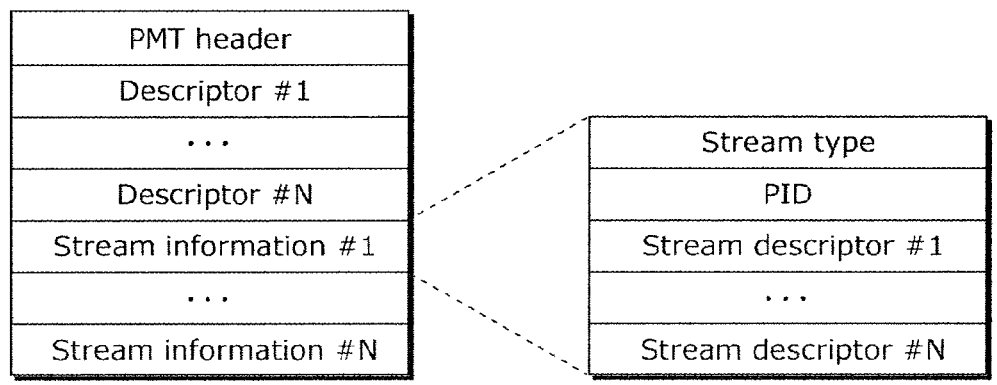
FIG. 38 illustrates a data structure of a PMT.

FIG. 38 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 39:
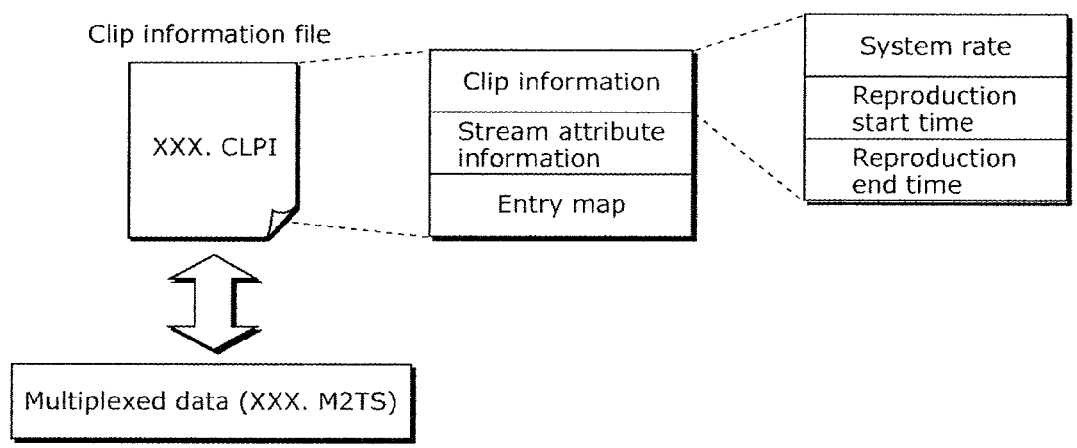
FIG. 39 illustrates an internal structure of multiplexed data information.

Each of the multiplexed data information files is management information of the multiplexed data as shown in FIG. 39. The multiplexed data information files are in one to one correspondence with the multiplexed data, and each of the files includes multiplexed data information, stream attribute information, and an entry map.

As illustrated in FIG. 39, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 40:
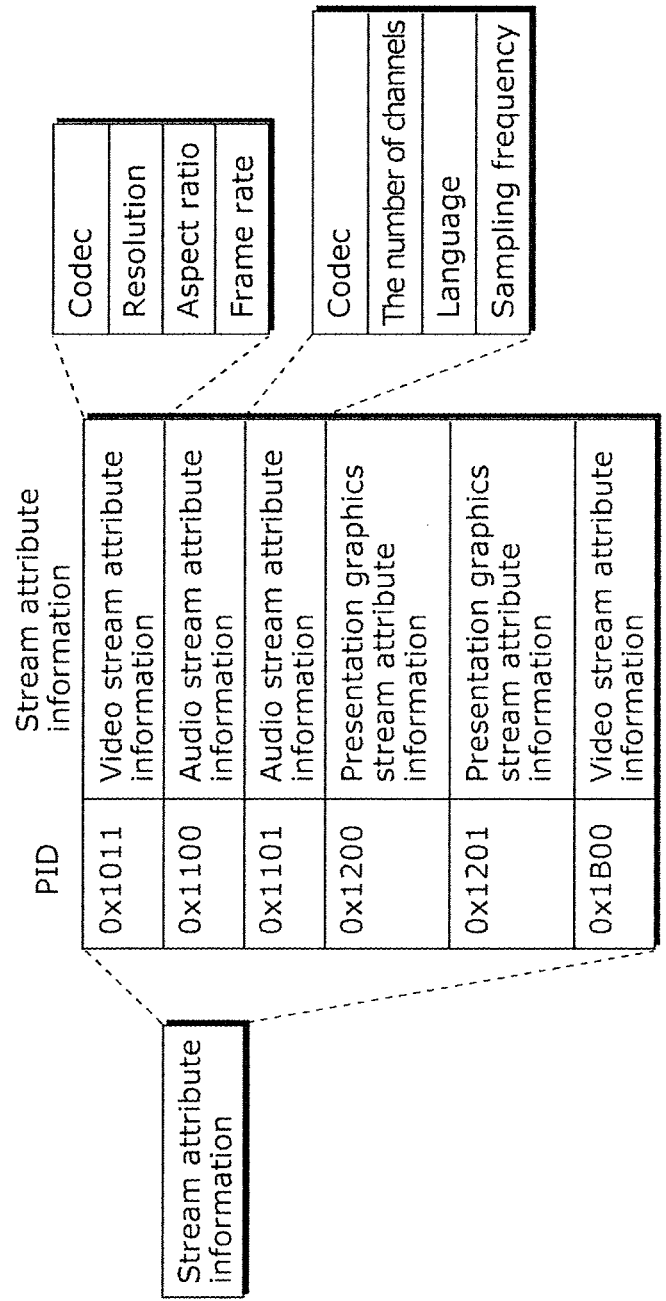
FIG. 40 illustrates an internal structure of stream attribute information.

As shown in FIG. 40, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 41:
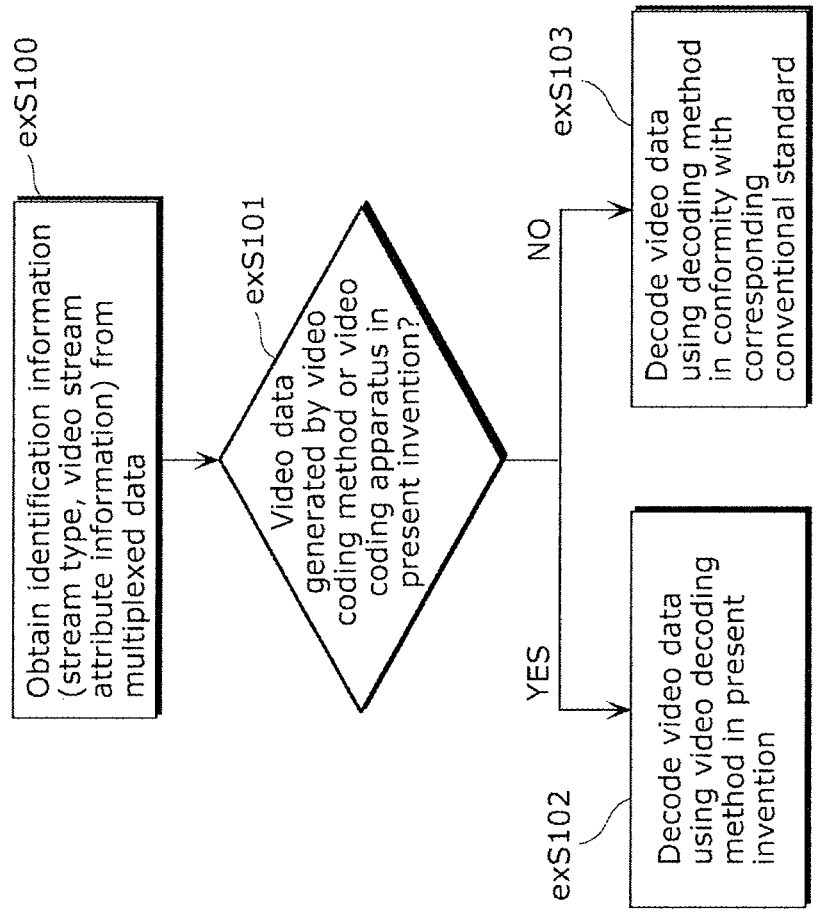
FIG. 41 illustrates steps for identifying video data.

Furthermore, FIG. 41 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 6

Figure 42:
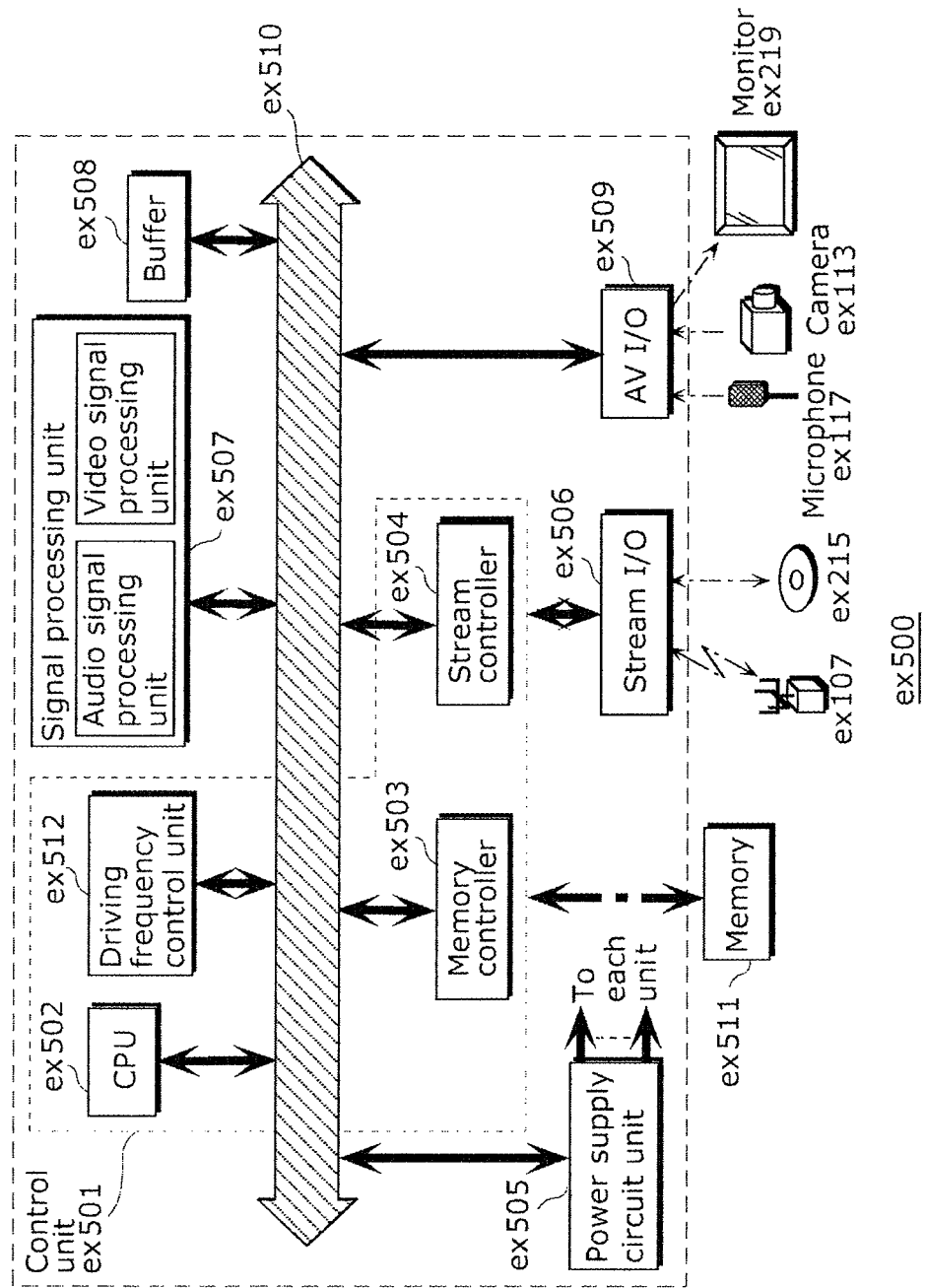
FIG. 42 illustrates an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 42 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such.

For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 43:
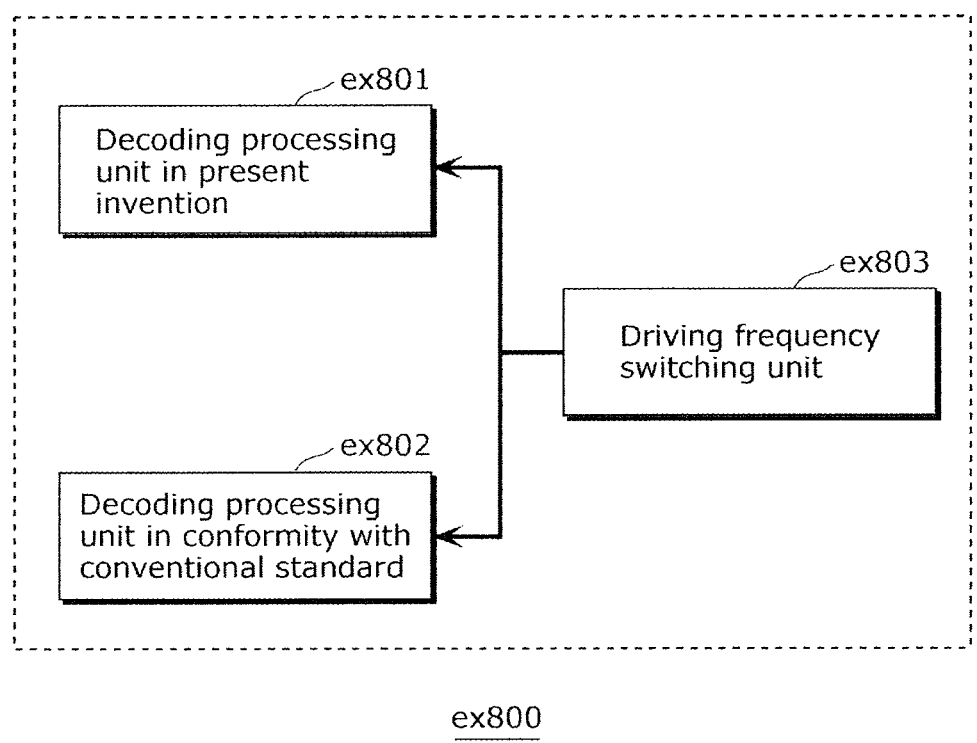
FIG. 43 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 43 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 42. Here, each of the decoding processing unit ex801 that executes the moving picture decoding method described in each of embodiments and the decoding processing unit ex802 that conforms to the conventional standard corresponds to the signal processing unit ex507 in FIG. 42. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 45. The driving frequency can be selected by storing the look-up table in the buffer ex508 and in an internal memory of an LSI, and with reference to the look-up table by the CPU ex502.

Figure 44:
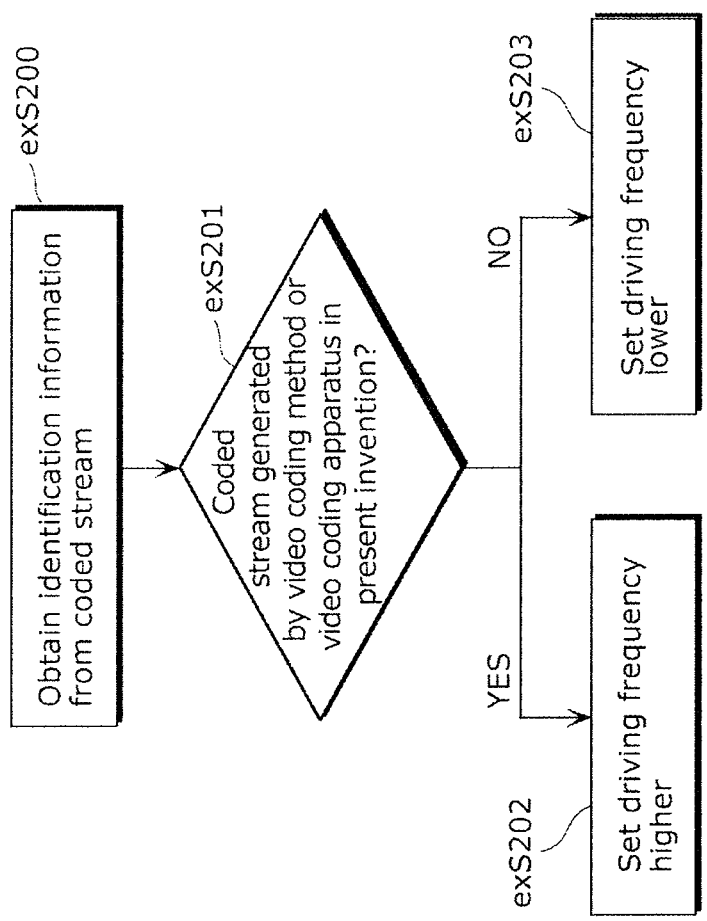
FIG. 44 illustrates steps for identifying video data and switching between driving frequencies.

FIG. 44 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 46A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by entropy decoding in particular, for example, the dedicated decoding processing unit ex901 is used for entropy decoding. Otherwise, the decoding processing unit is probably shared for one of the inverse quantization, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 46B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

INDUSTRIAL APPLICABILITY

The image coding method and the image decoding method according to an aspect of the present invention is applicable to, for example, television receivers, digital video recorders, car navigation systems, cellular phones, digital cameras, digital video cameras, and the like.

REFERENCE SIGNS LIST 100, 500, X00 Intra prediction mode decoder
101 Luma prediction mode prefix decoder
102 Luma prediction mode suffix decoder
103 Chroma prediction mode prefix decoder
104 Chroma prediction mode suffix decoder
105 503 Luma prediction mode reconstruction unit
106, 504 Chroma prediction mode reconstruction unit
200, 800 Image coding apparatus
205 Subtractor
210 Transform and quantization unit
220 Entropy coder
230, 420 Inverse quantization and inverse transform unit
235, 425 Adder
240, 430 Deblocking filter
250, 440 Memory
260, 450 Intra prediction unit
270 Motion detection unit 280, 460 Motion compensation unit
290, 470 Intra/inter change switch
400, 900 Image decoding apparatus
410 Entropy decoder
501 Mixed mode prefix decoder
502 Mixed mode suffix decoder
801 Coder
901 Decoder
1000 Coding unit
1001, 1002, 1003, 1004 Prediction unit
X01 Luma prediction mode decoder
X02 Chroma prediction mode decoder

The invention claimed is:

1. A decoding device configured to decode, from a bitstream, intra prediction modes indicated in pieces of binary data for decoding an image,
the decoding device comprises:
a processor, and
a storage coupled to the processor,
wherein
the pieces of binary data each includes a plurality of luma context-dependent segments, a plurality of luma context-independent segments, and a chroma context-dependent segment;
the processor performs the following, using the storage:
obtaining, from the bitstream, first encoded data including the plurality of luma context-dependent segments, second encoded data including the plurality of luma context-independent segments, and third encoded data including the chroma context-dependent segment,
performing, on each of the plurality of luma context-dependent segments, context adaptive binary arithmetic decoding using a variable probability to generate a plurality of decoded luma context-dependent segments, and separately perform, on the chroma context-dependent segment, context adaptive binary arithmetic decoding using a variable probability to generate a decoded chroma context-dependent segment,
performing, on each of the plurality of luma context-independent segments, bypass decoding using a fixed probability to generate a plurality of decoded luma context-independent segments,
deriving a plurality of luma intra prediction modes from one of the plurality of decoded luma context-dependent segments and a corresponding one of the plurality of decoded luma context-independent segments, and
deriving one chroma intra prediction mode from the decoded chroma context-dependent segment; and
the bitstream includes, in the following order, the first encoded data, the second encoded data and the third encoded data when the bitstream is compliant with a first standard, and the bitstream includes, in the following order, the derived plurality of luma intra prediction modes and the derived one chroma intra coded mode when the bitstream is compliant with a second standard different from the first standard.

2. A data decoding method, comprising:
decoding, using the at least one processor and from a bitstream, intra prediction modes indicated in pieces of binary data for decoding an image,
wherein the pieces of binary data each includes a plurality of luma context-dependent segments, a plurality of luma context-independent segments, and a chroma context-dependent segment;
wherein the decoding comprises:
obtaining, from the bitstream, first encoded data including the plurality of luma context-dependent segments, second encoded data including the plurality of luma context-independent segments, and third encoded data including the chroma context-dependent segment,
performing, on each of the plurality of luma context-dependent segments, context adaptive binary arithmetic decoding using a variable probability to generate a plurality of decoded luma context-dependent segments, and separately performing, on the chroma context-dependent segment, context adaptive binary arithmetic decoding using a variable probability to generate a decoded chroma context-dependent segment,
performing, on each of the plurality of luma context-independent segments, bypass decoding using a fixed probability to generate a plurality of decoded luma context-independent segments,
deriving a plurality of luma intra prediction modes from one of the plurality of decoded luma context-dependent segments and a corresponding one of the plurality of decoded luma context-independent segments, and
deriving one chroma intra prediction mode from the decoded chroma context-dependent segment; and
wherein the bitstream includes, in the following order, the first encoded data, the second encoded data and the third encoded data when the bitstream is compliant with a first standard, and the bitstream includes, in the following order, the derived plurality of luma intra prediction modes and the derived one chroma intra coded mode when the bitstream is compliant with a second standard different from the first standard.

* * * * *